United States Patent [19]

Shimizu et al.

[11] Patent Number: 4,860,111

[45] Date of Patent: Aug. 22, 1989

[54] INFORMATION TRANSMISSION SYSTEM

[75] Inventors: Katsuichi Shimizu, Kunitachi; Nao Nagashima, Yokohama, both of Japan

[73] Assignee: Canon Kabushiki Kaisha, Tokyo, Japan

[21] Appl. No.: 183,483

[22] Filed: Apr. 15, 1988

Related U.S. Application Data

[63] Continuation of Ser. No. 540,615, Oct. 11, 1983, abandoned.

[30] Foreign Application Priority Data

Oct. 18, 1982 [JP] Japan ............................. 57-182647
Oct. 21, 1982 [JP] Japan ............................. 57-185287
Oct. 25, 1982 [JP] Japan ............................. 57-187245

[51] Int. Cl.$^4$ ............................................ H04N 1/00
[52] U.S. Cl. ................................ 358/400; 353/434; 353/443; 364/514
[58] Field of Search ................ 358/280, 256, 257; 364/514

[56] References Cited

U.S. PATENT DOCUMENTS

| | | | |
|---|---|---|---|
| 3,238,360 | 3/1966 | Wright, Jr. et al. | 364/200 |
| 3,383,660 | 5/1968 | Herold et al. | 364/200 |
| 3,889,057 | 6/1975 | Perreault et al. | 358/257 X |
| 4,135,212 | 1/1979 | Pugsley et al. | 358/256 |
| 4,321,703 | 3/1982 | Schwaertzel et al. | 370/89 |
| 4,348,739 | 9/1982 | Deaver et al. | 364/900 |
| 4,383,277 | 5/1983 | Kubo | 358/280 |
| 4,456,956 | 6/1984 | El-Gohary et al. | 364/200 |
| 4,468,734 | 8/1984 | Lanier et al. | 364/200 |
| 4,491,873 | 1/1985 | Takayama | 358/256 |
| 4,549,219 | 10/1985 | Sue et al. | 358/257 |
| 4,586,086 | 4/1986 | Ohzeki | 358/256 |

OTHER PUBLICATIONS

Translation of Office Action dated 11-10-87 German Patent Application P 33 37 682.4–53.
Ein Fernkopierer der Gruppe 3 mit Empfangsautomatik in Tekade Tech. Mitt, 1981, pp. 11–18 w/partial translation.

Primary Examiner—Edward L. Coles, Sr.
Attorney, Agent, or Firm—Fitzpatrick, Cella, Harper & Scinto

[57] ABSTRACT

A system for information transmission among plural stations, in which each station can transmit image signals not only to a printer as its own station but to another station for printing, and in which the transfer of communicating right among the stations is achieved in a smooth manner for realizing uniform distribution of the right to communicate among all stations.

36 Claims, 18 Drawing Sheets

| FIG. 5A | FIG. 5B |

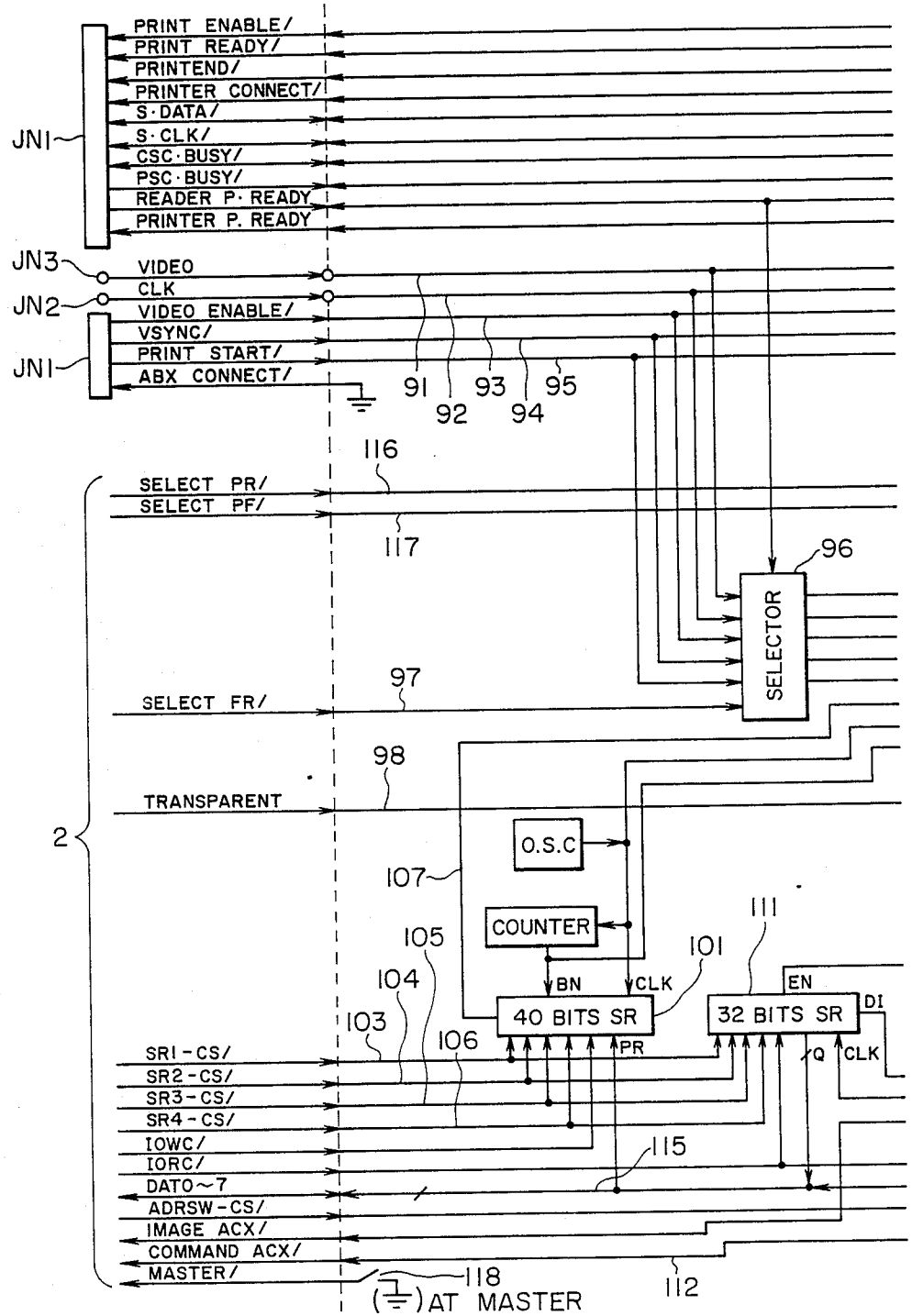

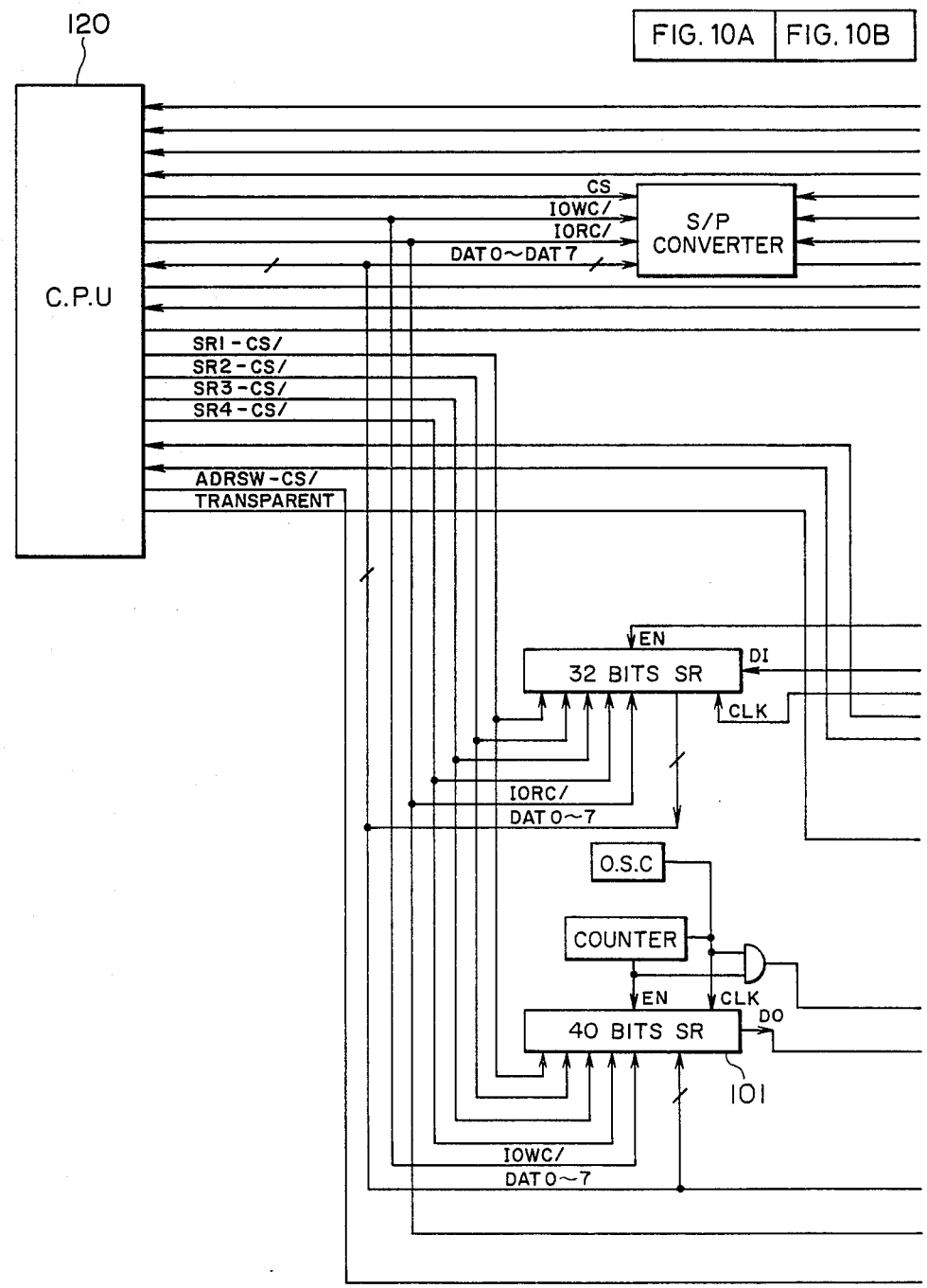

| FIG. 15A | FIG. 15B |

INFORMATION TRANSMISSION SYSTEM

This is a continuation of application Ser. No. 540,615 filed Oct. 11, 1983, now abandoned.

BACKGROUND OF THE INVENTION

1. Field of the Invention

The present invention relates to an information transmission system in which image signals read, for example, from an original are transmitted to a distant recording unit for recording.

2. Description of the Prior Art

The function of a copier has been limited to faithful reproduction of an original and image magnification or reduction with predetermined size ratios. Such a copier functions by illustrating an original with a light source such as a fluorescent lamp or a tungsten lamp, guiding the reflected light through mirrors and lenses to a previously charged photosensitive member to form an electrostatic latent image thereon, and then applying developer to said photosensitive member to obtain a visible image. Thus the imaging process is entirely achieved through mechanical control, and it has therefore been difficult to separate the imaging unit from the original scanning unit. Such copier is therefore unable to adequately respond to the ever increasing demands of information processing.

For this reason there is proposed an information transmission system, generally called a network, for transmitting image signals obtained by photoelectric conversion of an original to a distant recording unit and for information transmission among plural word processor and office computers.

However, in case of information transmission among plural stations in such network, it has been difficult to uniformly distribute the communicating right for utilizing the transmission channel among different stations.

Also it is quite difficult to know the contents of plural stations connected to the communication channel, and there may exist two stations with the same station address, or there may occur an error in the communication.

Also the information transmission under execution may be undesirably affected by a station joining the communication system later

SUMMARY OF THE INVENTION

In consideration of the foregoing, an object of the present invention is to provide an information transmission system capable of achieving smooth information transmission.

Another object of the present invention is to provide an information transmission system suitable for the transmission of image signals.

Still another object of the present invention is to provide an information transmission system enabling each station to print image signals read therein not only in said station but also in other stations.

Still another object of the present invention is to provide an information transmission system capable of achieving smooth transmission of the communicating right in the transmission channel Still another object of the present invention is to provide an information transmission system capable of properly copying with an abnormality in the information transmission.

Still another object of the present invention is to provide an information transmission system capable of avoiding undesirable effect on the information transmission at the entry of a new station to the system and during the initial state of said station.

Still another object of the present invention is to provide an information transmission system suitable for information transmission through a loop-shaped transmission channel.

The foregoing and still other objects and advantages of the present invention will become fully apparent from the following description.

BRIEF DESCRIPTION OF THE DRAWINGS

FIG. 11 is a chart showing the formats of command data;

DETAILED DESCRIPTION OF THE PREFERRED EMBODIMENTS

Now the present invention will be explained in detail with particular reference to the attached drawings It is to be understood that the present invention is applicable to information transmission among plural stations equipped with electronic appliances such as word processor, office computer, image processing apparatus, etc., which will be represented by image reading apparatus and image recording apparatus in the following embodiment.

Also in the following embodiment the transmission channel connecting the stations is assumed to be loop-shaped, but the present invention is likewise applicable to transmission channels of other forms such as star-type or hearth type networks.

Figure 1:
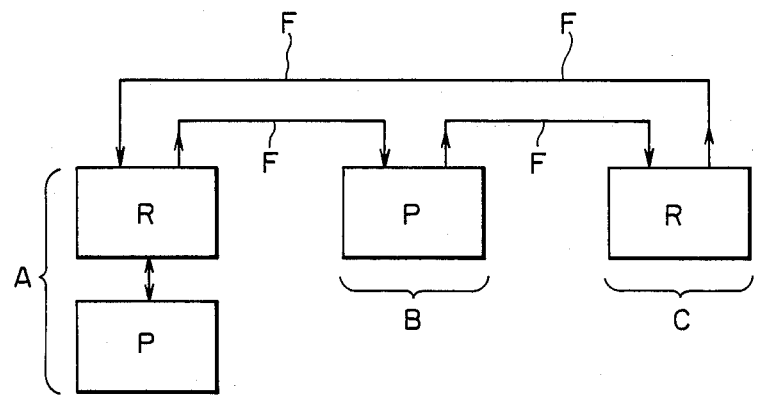
FIG. 1 is a schematic view showing an example of a network embodying the present invention.

FIG. 1 schematically shows an image transmission network embodying the present invention, wherein an optical transmission channel F composed of an optical fiber cable connects stations A, B and C in a loop for enabling exchange of image information among said stations. The station A is provided with a reader unit R for generating image signals by photoelectric conversion of an original image, and a printer unit P for image recording on a recording material such as paper in response to entered image signals, said reader R and printer P being mutually connected through an electric cable. On the other hand the station B is equipped with the aforementioned printer unit P only, and the station C is equipped with the aforementioned reader unit R only. Each of the stations A, B and C is provided with a communication module for enabling optical communication through the optical communication channel F.

Figure 2:
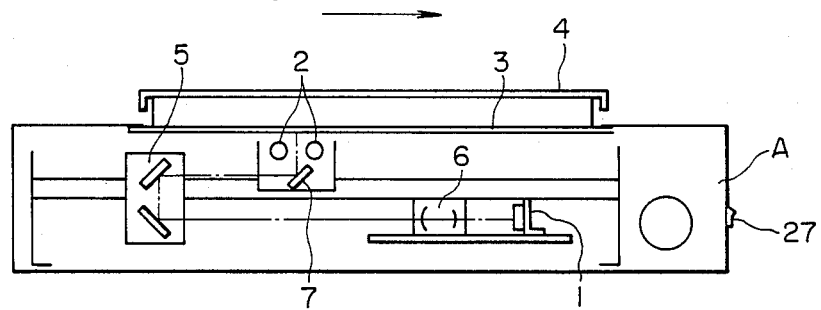
FIG. 2 is a cross-sectional view showing an example of the reader unit R.

FIG. 2 is a cross-sectional view of the reader unit R, wherein a numeral 27 represents a power switch. An original document is placed, with the image face thereof downwards, on an original supporting glass 3 at a reference position at the rear left corner as viewed from the front side of the reader unit, and is pressed by a movable cover 4 against said glass. The original is illuminated by a fluorescent lamp 2, and an optical path is formed to guide the reflected light through mirrors 7, 5 and a lens 6 to a CCD 1, wherein said mirrors 7, 5 are moved at a speed ratio of 2:1 in a direction indicated by an arrow. The above-described optical unit is moved by a DC servo motor at a constant speed from left to right. The moving speed in the forward motion (direction of arrow) for scanning the original is 180 mm/sec., and is 480 mm/sec. in the reverse motion. The resolving power in the subsidiary scanning direction is equal to 16 lines/mm. Acceptable range of the original size is from A5 (148.5 mm×210 mm) to A3 (297 mm×420 mm), and the original of a size A5, B5 or A4 is placed in a longitudinally long orientation while the original of a size B4 or A3 is placed in a laterally long orientation. According to the original size the optical system is reversed at three different points, a first reversing point being distanced by 220 mm from the reference point of the original and used commonly for the sizes A5, B5 and A4, a second one for the size B4 being distanced by 364 mm and a third one for the size A3 being distance by 431.8 mm.

The main scanning width is 297 mm which is equal to the lateral width of the A4 size. In order to obtain a resolving power of 16 pel/mm, the CCD is required to have 4752 (=297×16) bits, which are obtained in the present embodiment by two charge-coupled device (CCD) array sensors of 2628 bits each, driven in parallel manner Under the above-mentioned conditions n=16 lines/mm and V=180 mm.sec., the main scanning interval, or the charge accumulating time of CCD is given by: $T = 1/V.n = 1/180 \times 16 = 347.2$ microseconds. Also the signal transfer rate of the CCD's is given by: $f = N/T = 2628/347.2 = 7.569$ MHz.

Figure 3:
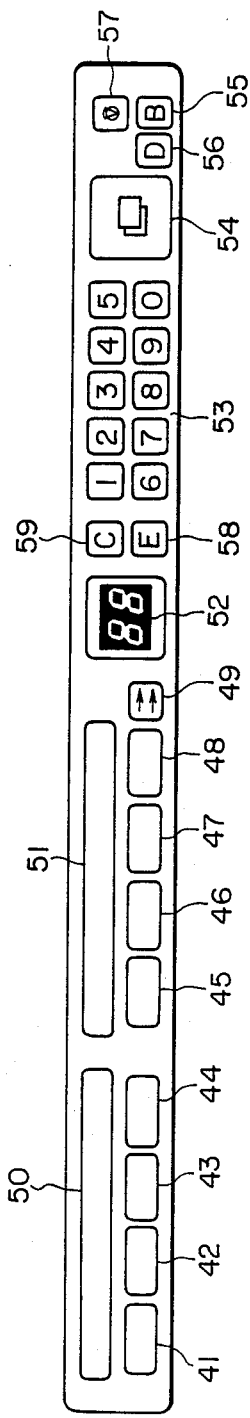
FIG. 3 is a plan view showing an example of an operation unit thereof.

FIG. 3 shows an operation unit provided on the reader unit R and used for transmitting the image signals read in the reader unit R to a desired printer P in the network for conducting image recording. Liquid crystal 5×7 dot matrix display units 50, 51 of 20 digits each display guidance data, such as recording size, addressee of transmission, image processing mode, etc., for selection by the operator through keys 41–48 positioned under said display units corresponding to the positions of said display. The contents of said display are changed in succession by the actuation of an et cetra (ETC) key 9a, so that the operator depresses said key continuously until the desired guidance data appear in the display A copy counter 52 is composed of 2-digit 7-segment light-emitting diode display elements, which are positioned apart from the aforementioned displays 50, 51 for making clear distinction therefrom. Numeral keys 53 are used for entering numbers such as copy number, address of transmission, number of transmission, trimming coordinates and image shifting coordinates required in the image editing etc. There are also provided an end key E 58 for completing an entry; a clear key 59 for cancelling a number entry; a start key 54 for instructing the start of an original reading operation; image quality selecting keys 55 for selecting a binary digitized image and 56 for selecting a halftone copy produced in 32 levels through a dither process; and a stop key 57 for terminating the copying operation.

Figure 4:
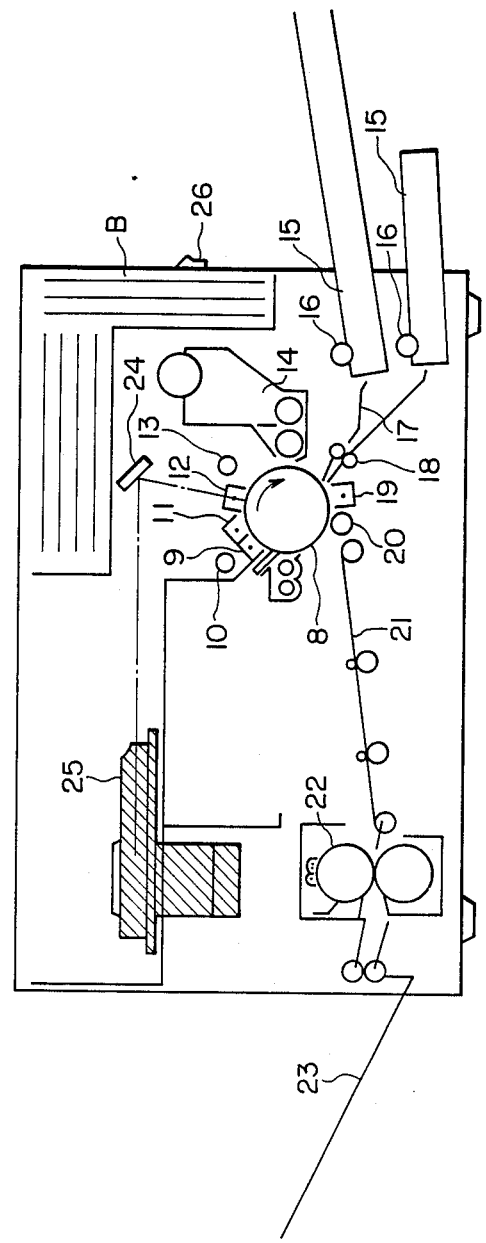
FIG. 4 is a cross-sectional view showing an example of the printer unit P.

Now reference is made to FIG. 4 for explaining the outlined structure of the printer unit P. Power supply is controlled by a power switch 26. Bit-serial image signals are supplied to a laser scanning optical unit 25, composed of a semiconductor laser, a collimating lens, a rotary polygonal mirror, an $F\theta$ lens and a correcting optical system. The image signals from the reader unit R are supplied to the semiconductor laser for electro-optical conversion therein to generate a diverging laser beam, which is converted into a parallel beam and guided to the polygonal mirror rotated at a high speed to scan a photosensitive member along the rotary axis thereof Said polygonal mirror is rotated at a constant speed of 2600 rpm to obtain a scanning width of ca. 400 mm, including an effective image width of 297 mm corresponding to the longer dimension of the A4 size. Consequently the signal frequency applied to the semiconductor laser is approximately 20 MHz. The laser beam from said unit 25 is guided to the photosensitive member 8 through a mirror 24.

Said photosensitive member 8 has, as an example, a three-layered structure composed of a conductive layer, a photosensitive layer and an insulating layer in the order from inside to outside, and is associated with process components for image formation through an electrophotographic process, including: a preliminary charge eliminator 9; a preliminary charge eliminating lamp 10; a printer charger 11; a secondary charger 12; a flush exposure lamp 13; a developing unit 14; a paper cassette 15; a paper feeding roller 16; a paper feeding guide 17; a registration roller 18; a transfer charger 19; a separating roller 20; a transport guide 21; a fixing unit 22; and a tray 23. The photosensitive member 8 and the paper transporting system are driven by an unrepresented motor at a speed 180 mm/sec. which is selected same as that in the forward motion of the reader unit R, in order to achieve image formation on real-time basis. Consequently a copying speed of 30 sheet/min. in A4 size can be obtained when the reader unit R is combined with the printer unit P. In the printer P there is employed a separating belt at the front side for separating the copy sheet from the photosensitive drum 8, so that the image is not reproduced in an area corresponding to the width of said separating belt. If the image signals are given also in this area, the toner deposited in this area will smear the separating belt, thus causing stains on the succeeding sheets Consequently the printer cuts off the image signals in this area of a width of 8 mm corresponding to the separating belt. Similarly the reader cuts off the image signals at the leading end, of a width of 2 mm, of a sheet since a sheet with toner at the leading end will tend to stick to the fixing roller, thus causing sheet jam.

As explained before, the reader unit R shown in FIG. 2 and the printer unit P shown in FIG. 4 are mutually connected through an electric cable within the station A, and these two units may be positioned arbitrarily, for example in vertical arrangement or in side-by-side arrangement within a range permitted by said electric cable.

Figures 5, 5A:
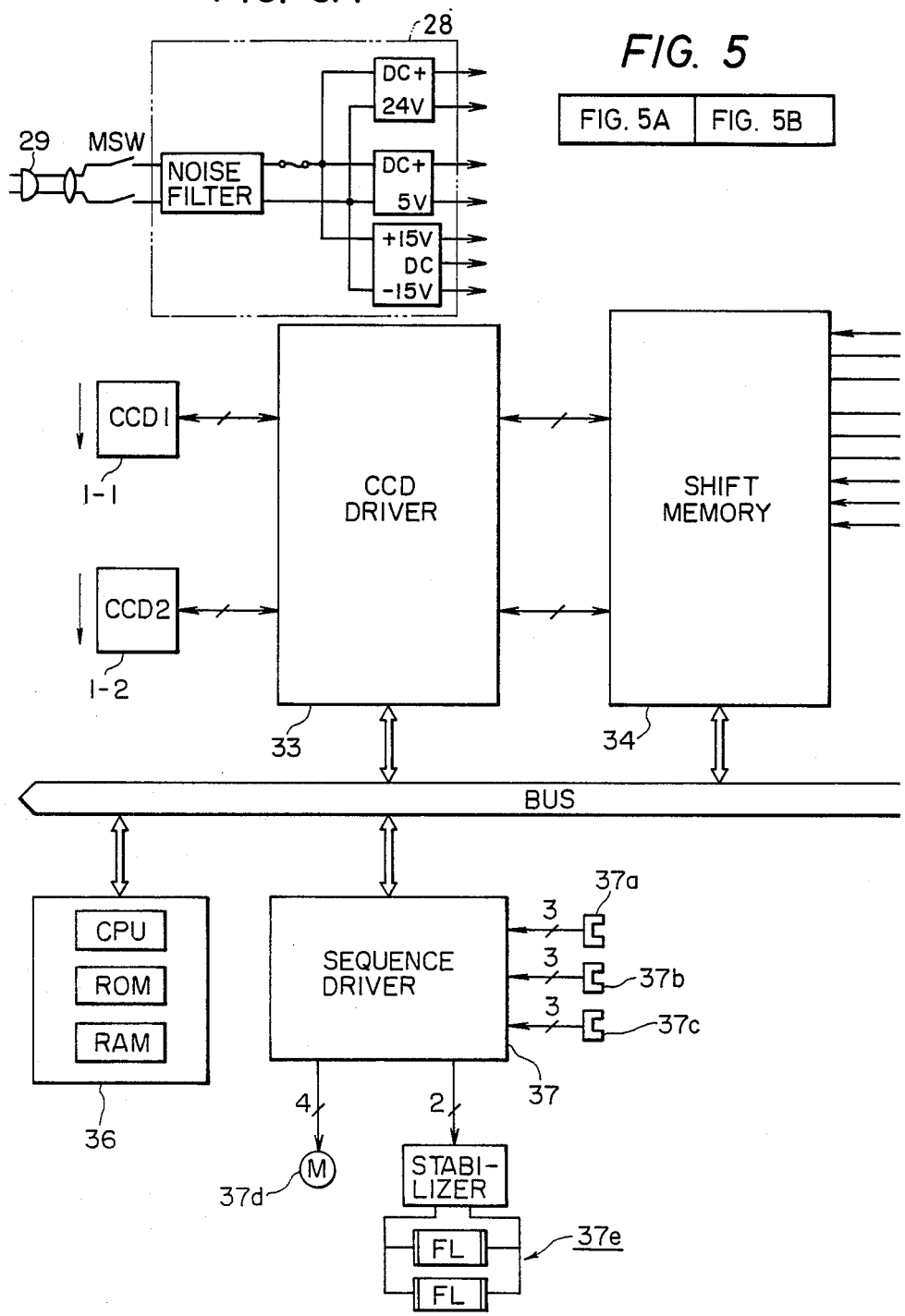
FIG. 5, composed of FIGS. 5A and 5B, is a block diagram showing an example of the circuit in said reader R.
Figure 5B:
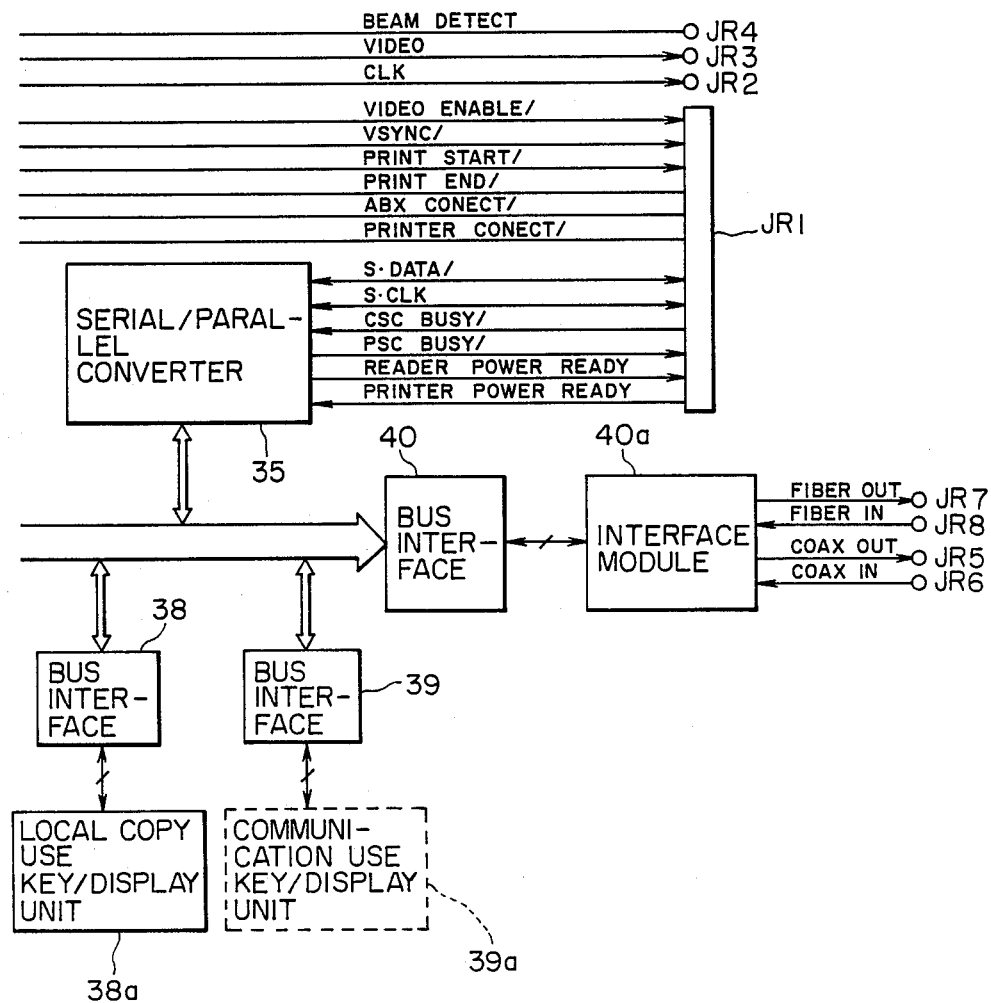

FIG. 5 is a block diagram showing an example of the circuit of the reader unit R, wherein illustrated are CCD's 1-1, 1-2 shown in FIG. 1; a CCD driver circuit 33 for driving said CCD's and processing the output signals therefrom; a shift memory circuit 34 for further processing the output signals of said driver circuit 33 for achieving image trimming, shifting, magnification, reduction etc.; a serial-to-parallel converter 35 for protocol communication with the printer; a microcomputer 36 for supplying or receiving control signals to or from various blocks through a bus line BUS and provided with a program read-only memory ROM and a data random access memory RAM; a sequence driver 37 for controlling the sequence of moving the optical system for subsidiary scanning by receiving signals from a home position senor 37a, an image leading end sensor 37b, and a print start position sensor 37c provided along the moving path of the optical system and controlling sheet feeding and registering operations, a sub-scanning DC motor 37d and an exposure lamp 37e in the printer unit, wherein each of said sensors 37a, 37b, 37c is composed of a photointerrupter to be actuated by an unrepresented light shield cam provided in a block of the first mirror 7; a bus interface 38 for supplying or receiving signals to or from an operation unit 38a; and a bus interface 39 for supplying or receiving signals to or from a communication key/display unit 39a. Interface signals between the reader R and the printer P are shown at right.

In case the reader R is directly connected with the printer P without the communication function, connectors JR1, JR2, JR3, JR4 from the shift memory 34 and the serial-to-parallel converter 35 are connected to connectors JP1, JP2, JP3, JP4 of the printer P.

In case of communication with the exterior, the signals to supplied to the connectors JR1, JR2, JR3 are supplied through the bus interface 40 to a communication interface module 40a, and are simultaneously through the communication interface 40a to the connectors JP1, JP2, JP3 of the printer. However the connector JR4 is directly connected with the connector JP4 of the printer also in this case.

The communication interface 40a is connected with a communication medium either through optical connectors JR7, JR8 or coaxial connectors JR5, JR6. The optical connectors JR7, JR8 are selected in the case of long-distance transmission, while the coaxial connectors JR5, JR6 are selected in case of short-distance transmission.

A beam detection signal BD in the connector JR4 is used for synchronizing the supply of image signals from the reader R to the printer P, in case it is connected, with the rotation of the polygonal mirror therein. Said signal corresponds to a leading end signal in each scanning line, and is generated in response to the detection of the laser beam in the printer P by an unrepresented beam detector positioned at a side of the photosensitive drum. Image signals VIDEO and clock signals CLK respectively in the connectors JR3, JR2 consist of 4752 pulses each with an interval of 72 ns per one scanning line. Said signals are released in synchronization with the beam detection signal when the printer is connected, or with a similar internal signal in other cases, such as in case of signal transmission to another station. The connector JR1 transmits a VIDEO ENABLE signal indicating the duration of the release of image signals of a line, namely 4752 bits, and released in synchronization with the beam detection signal or with another similar internal signal; a VSYNC signal indicating the start of release of image signals and released in synchronization with the output signal from the image leading end sensor 37b and with the beam detection signal or a similar internal signal with a same duration as that of the VIDEO ENABLE signal; a PRINT START signal for instructing sheet feeding to the printer and released at the interval from the signal VSYNC to be determined in consideration of the image magnification ratio and the image trimming area; a PRINT END signal to be released from the printer P when the trailing end of a copy sheet is separated from the photosensitive drum and becomes supported by the conveyor belt, for indicating the completion of a copying operation, said signal being generated upon detection of completed separation of a copying sheet or at a sequence timing; an ABX CONNECT signal indicating the connection of the communication interface module 40a, in which the corresponding terminal is grounded to enable the communication; and a PRINTER CONNECT signal to be released when the printer is connected, said signal being grounded in the printer to enable the function thereof.

Serial signals S.DATA, SCLK, CSC BUSY, PSC BUSY are used for protocol between the reader R and the printer P for image recording. 16-bit protocol signal S.DATA and clock signal SCLK are both bidirectional. The signal CSC BUSY is released when the reader R releases the protocol signal and clock signal to the bidirectional signal line, and the signal PSC BUSY is released when the printer P releases said signals, thus indicating the direction of transmission of the signals S.DATA and S.CLK.

The control of the reader unit is governed by a central processing unit (CPU) corresponding to the microcomputer 36, which performs the key/display control, sequence control, protocol for optical communication and for printer, and presetting of various counters in a discrete image processing circuit accord to instructions from a key-display unit. The CCD driver 33 drives two CCD's 1-1, 1-2 by supplying power and timing signals thereto, receives serial signals obtained by optoelectric conversion of an original image and provides binary digital signals by amplification and analog-to-digital conversion of said serial signals. The shift memory 34 converts two series of digitized image signals respectively obtained from two CCD's into a series of signals without overlapping, thereby producing serial VIDEO signals of 4752 bits per line, corresponding clock signals CLK and other timing signals explained above. The serial-to-parallel converter 35 functions as an interface for converting serial protocol signals for the printer into parallel signals to be directly fed to the bus line of the CPU. The sequence driver 37 is provided with an interface for three sensors provided on the moving path of the optical unit, a driving circuit for the exposure fluorescent lamp, a driving circuit for the DC motor for subsidiary scanning, and a PLL circuit for speed control. The bus interfaces 38, 39 connect operation keys shown in FIG. 3 and a driving circuit for the 5×7 dot matrix 20-digit liquid crystal display units with the bus line BUS of the CPU. A power supply unit receives the commercial electric power from a plug and produces DC 24 V, 5 V and 15 V for driving various blocks. A main switch MSW corresponds to the switch shown in FIG. 2.

Figures 6, 6A:
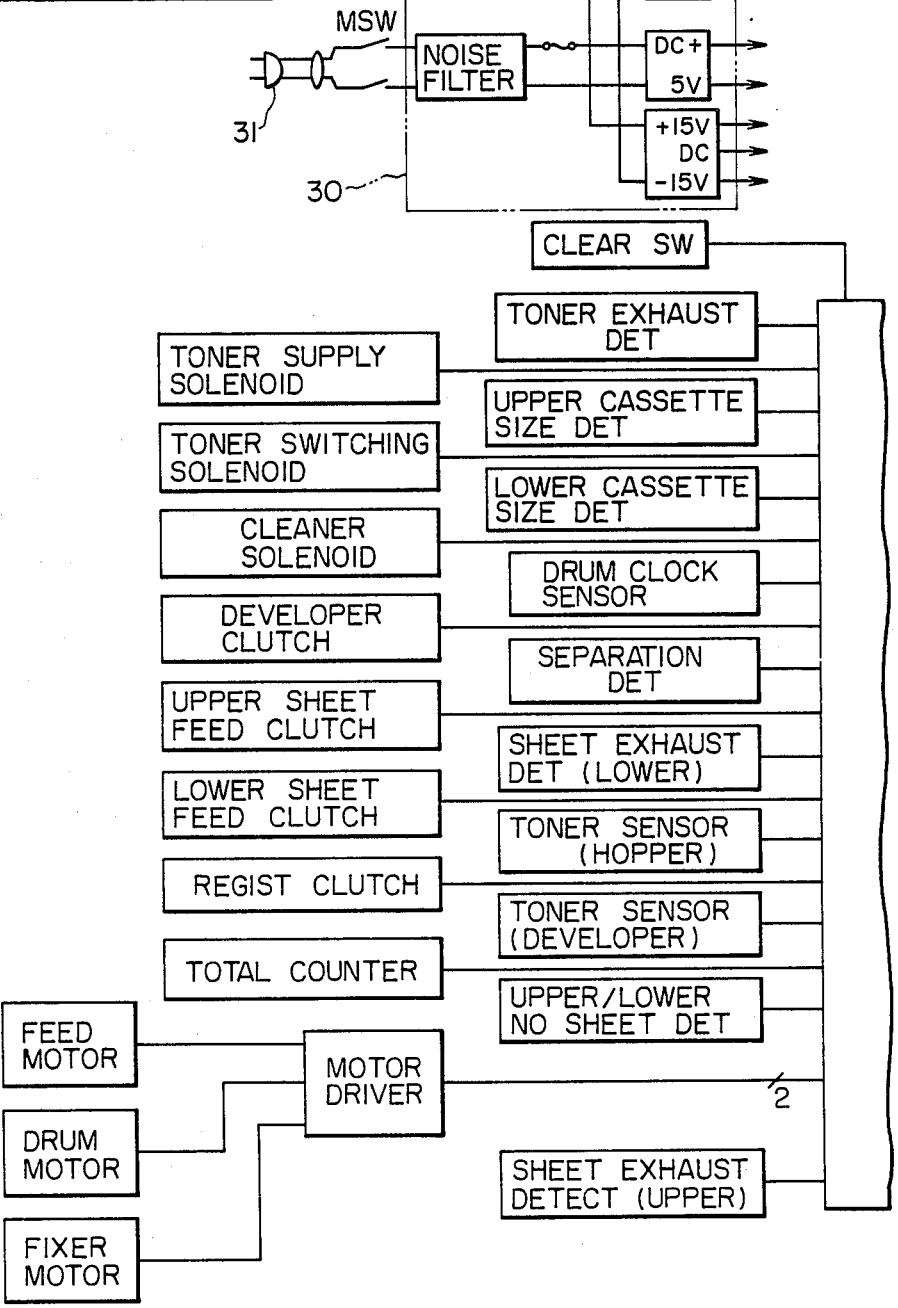
FIG. 6, composed of FIGS. 6A and 6B, is a block diagram showing an example of the circuit in said printer P.
Figure 6B:
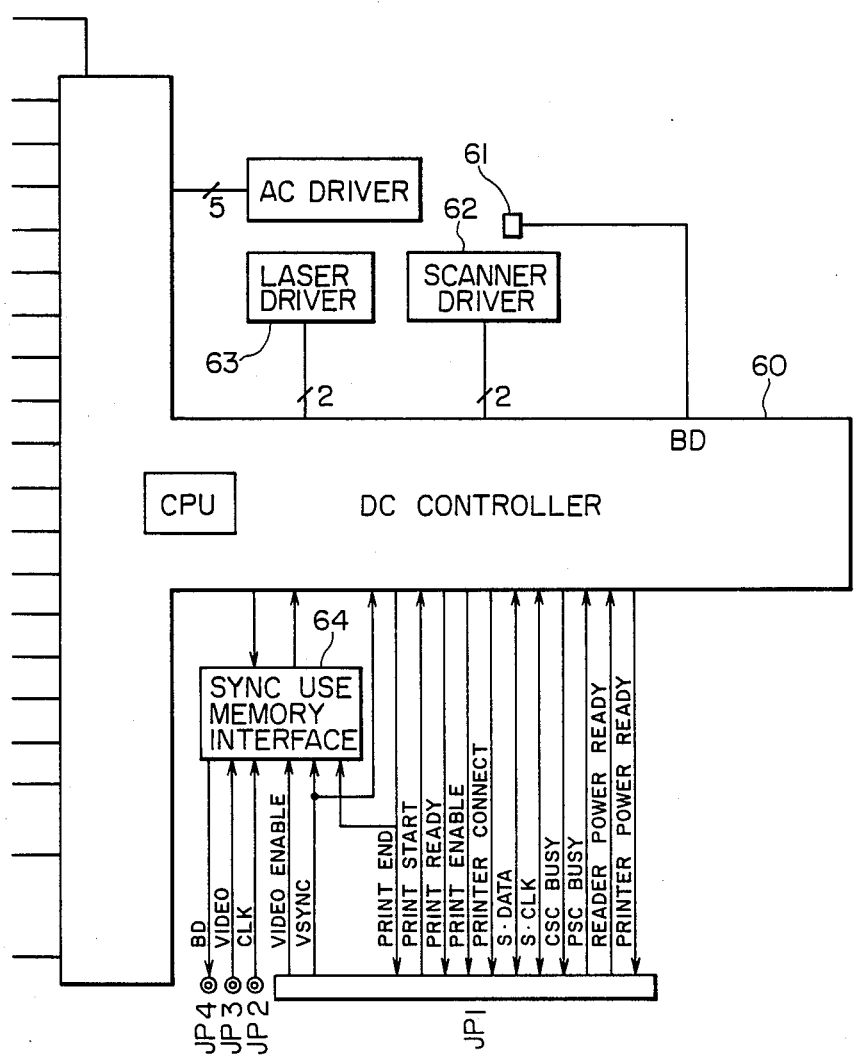

FIG. 6 is a circuit block diagram of the printer unit shown in FIG. 4, of which control is governed by a DC controller 60 wherein a CPU performs communication with the communication interface module for communication control with the reader R or communication control when the reader R is singly used for external communication through an optical fiber F, control for starting a scanner 62, control for the laser 63 and detection of the beam detection signal BD supplied from the laser beam detector 61. The direct connection with the reader unit R is conducted through the connectors JP1–JP4 as explained before. The connectors JP2, JP3 receive the clock signals CLK and the image signals VIDEO generated in the reader R in the form of 4752 bits per line with a rate of 13.89 MBPS. The connector JP4 transmits the beam detection signal BD indicating the detection, by the sensor 61, of the laser beam obtained when the scanner and the laser are activated by the DC controller 60. Said sensor 61 is positioned 11 mm in front of a reference point for the copy sheet transfer. Consequently image formation synchronized with the copy sheet can be achieved by temporarily storing the image signals from the reader R in a synchronizing memory interface 64 and supplying said signals to the laser at a timing delayed from said signal BD by an interval corresponding to said 11 mm in scanning operation.

A power supply unit 30 receives the commercial electric power from a plug 31 and produces DC voltages for driving the DC controller and other drivers. A main switch MSW corresponds to the main power switch shown in FIG. 4.

The connector JP1 transmits the following signals: a VIDEO ENABLE signal indicating the effective period for each line of the VIDEO and CLK signals, and rendered active, therefore, during the release of 4752-bit signals; a VSYNC signal synchronized with the signal from the image leading end sensor 37b and indicating the start of release of the signals VIDEO, CLK and VIDEO ENABLE, which are also supplied to the synchronizing memory interface 64 and to the controller 60, whereby the DC controller 60 activates, in response to the VSYNC signal, the registration roller for synchronizing the leading end of the copy sheet with the image signals; a PRINT START signal instructing the sheet feeding; a PRINTER CONNECT signal indicating the connection of the printer to other stations; a PRINTER POWER READY signal indicating that the printer P is powered through the power switch MSW and that the CPU in the printer P has completed the initialization step; a READER POWER READY signal indicating that the reader R is powered and that the CPU therein has completed the initialization step; and signals S.DATA, S.CLK, CSC BUSY and PSC BUSY for communication with the reader or the communication module 40a. The synchronizing memory interface 2 has a function of supplying the image signals VIDEO, in synchronization with the beam detection signal from the DC controller and also with the rotating speed of the scanner, to the laser driver through the DC controller.

Figure 7:
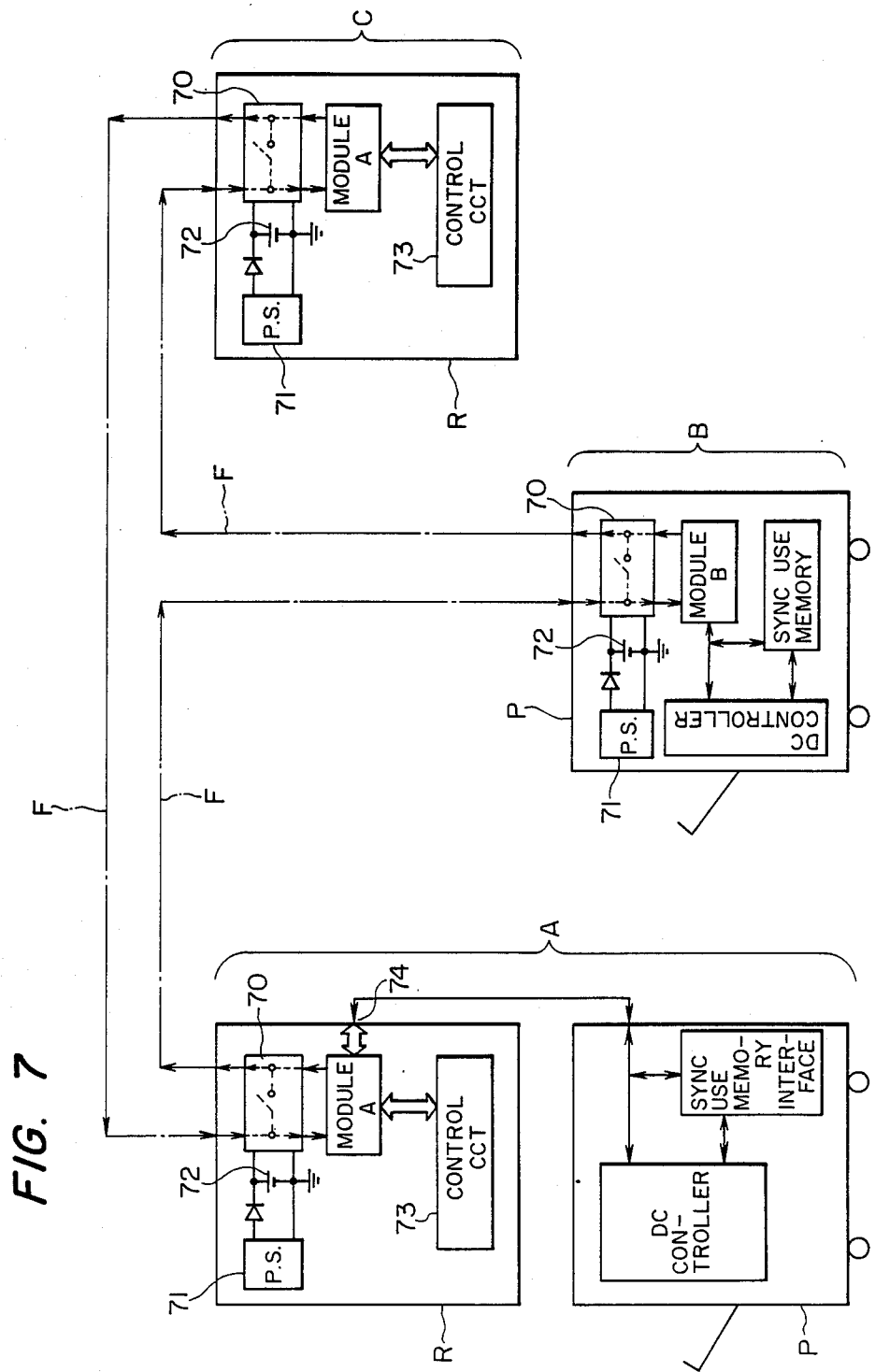
FIG. 7 is a diagram showing the internal structure of a network.

FIG. 7 shows the structure of different stations in the network shown in FIG. 1. As explained before, the station A is provided with the reader R and the printer P, while the station B is provided with the printer P alone, and the station C is provided with the reader R alone.

The optical transmission channel F is composed of an optical fiber, and each station is equipped with the aforementioned communication module 40a for enabling information exchange with said channel. There are provided two different communication modules, namely a module A for a station provided with the reader R and capable of acquiring a communicating right in the network, and a module B for a passive station provided with the printer P alone and conducting the image recording operation according to the received image signals. The communication module A is provided with a function of delivering instructions to other stations according to a command for transmission given by an operator, while the communication module B only has a function of controlling the operation in response to a command entered by an operator.

The communication module A is provided in the station A containing both the printer P and the reader R, and also in the station C containing the reader R alone. Also the communication module B is provided in the station B containing the printer P alone.

The communication module A or B achieves connection with the optical fiber F through a transceiver module 70, comprising an opto-electric (O/E) converter, an electro-optical (E/O) converter and an electronic "transparent" switch for directly connecting the input terminal with the output terminal A backup battery 72 is provided parallel to a power supply unit 71, for power supply to the O/E converter, E/O converter and electronic switch under certain conditions. In the normal state the transceiver module 70 is powered by the constant-voltage power source (PS) 71, but it is powered by the battery 72 when the power source is turned off Also in case of the power supply from the battery 72, the electronic switch is closed to directly connect the input terminal with the output terminal of the transceiver module 70. Consequently the loop-shaped communication channel of the system is secured even if the power supply is interrupted for some reason. Said backup battery 72 may be integrally provided in the transceiver module 70 and the communication interface module 40a.

The station A is provided with the connectors 74 (JM1–JM4) for connecting the communication interface module A with the printer P, said connectors being connected to the connectors JP1–JP4 of the printer shown in FIG. 6. Thus, in the absence of transmission function the connectors JP1–JP4 of the printer are connected directly to the control circuit 73 through the connectors JR1–JR4 of the reader R, but in case the reader R has the communication function and is equipped with the communication module A, the signals are transmitted also to the printer P attached to said reader through the communication module A.

In case of recording, in the station B, the image signals transmitted through the optical fiber F, the connectors JP1–JP4 of the printer P are connected to the connectors JM1–JM4 of the communication module B for transmitting the image signals for image recording.

The station C is constructed approximately in the same manner as the reader R of the station A, except that the connectors of the communication module A are not connected to a printer P. However a printer P may be connected if necessary to achieve a function similar to that of the station A.

From the tranceiver module 70 to the optical fiber transmitted are the command data, PRINT START signal for instructing sheet feeding to the printer, encoded image signals VIDEO and vertical synchronization signal VSYNC. The information flow in the optical fiber loop is mono-directional as indicated by an arrow, and in fact achieved through a single optical fiber. Consequently all the information is encoded, at the signal output, by the Manchester process for synthesizing the information and the clock signals in such a manner that said information can be handled in the control circuit 73 and in the communication module in synchronization with the corresponding clock signals. The signals entered from the optical fiber are decoded into the information and the clock signals by a decoding circuit in the communication module.

Figure 8:
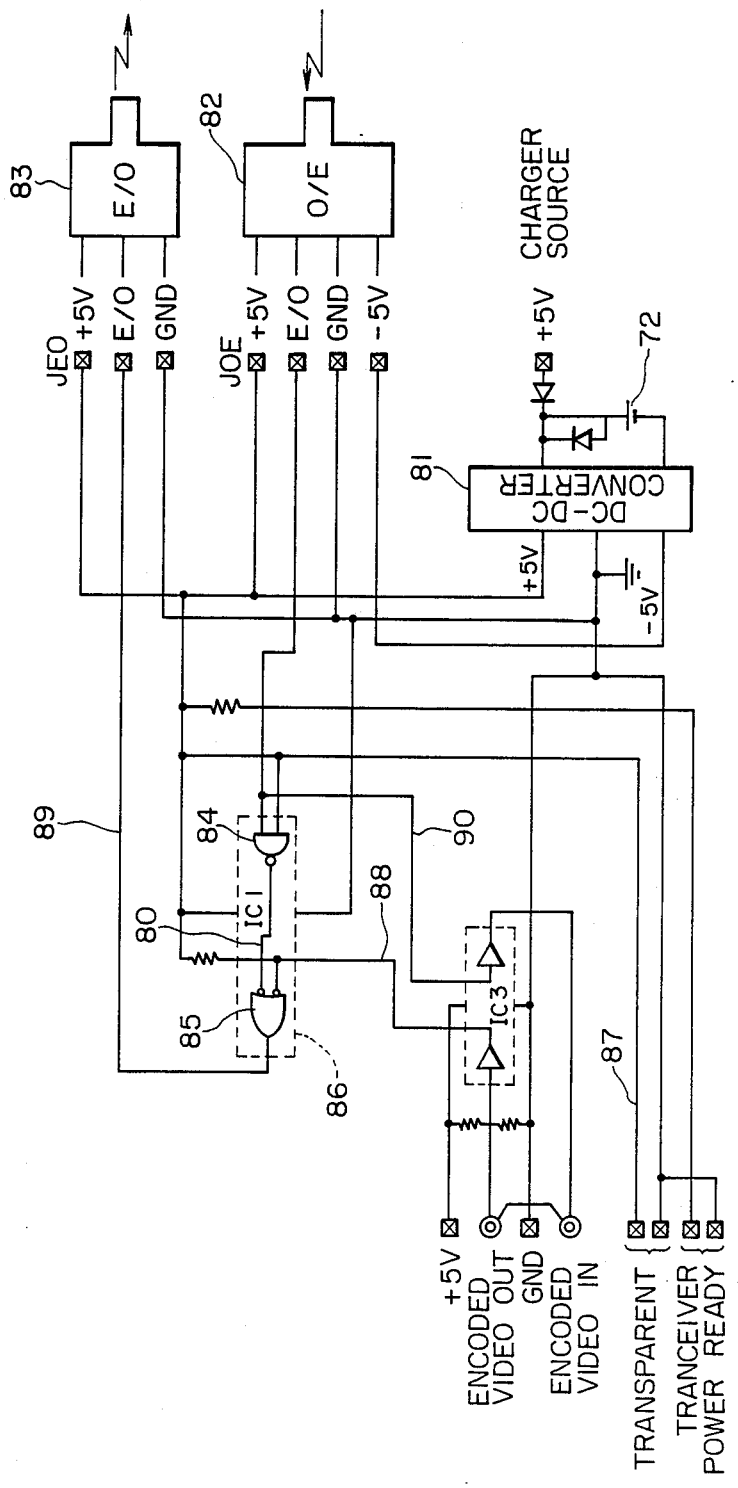
FIG. 8 is a circuit diagram showing an example of the electronic switch.

FIG. 8 shows the structure of the tranceiver module 70. A DC-DC converter 81 receives a charger power supply of +5 V when the power supply is turned on. The aforementioned backup battery 72 supplies electric power to said DC-DC converter 81, which therefore releases voltages of ±5 V even when the power supply to the system is turned off. Said voltages ±5 V are supplied to an O/E converter 82, while the voltage +5 V is supplied to an O/E converter 83 and NAND gates 84, 85.

The electronic switch mentioned in relation to FIG. 7 consists of a broken-lined block 86 comprising said NAND gates 84, 85, and is turned on and off by a TRANSPARENT signal from the system. In case the power supply to the system is not turned on or interrupted, a signal line 87 for said TRANSPARENT signal becomes open so that the gate 84, receiving an H-level input signal, transmits the signals from the O/E converter 82 to the NAND gate 85. As a signal line 88 to said NAND gate 85 is also at the H-level state, the signals from the NAND gate 84 are transmitted through said NAND gate 85 and a line 89 to the E/O converter 83. Consequently, when the power supply to the station is turned off, the signals are transmitted directly from the O/E converter 82 to the E/O converter 83.

In response to the aforementioned signals PRINT START, VSYNC and VIDEO (excluding COMMAND DATA), said TRANSPARENT signal line 87 is shifted to the H-level to directly connect the O/E and E/O converters, and in such case said signals are also taken into the station through a signal line 90. In this manner all the stations connected to the optical fiber channel can receive the above-mentioned signals simultaneously. The above-described operation mode for information transmission from the O/E converter 82 to the E/O converter 83 is called TRANSPARENT mode.

On the other hand, in response to the COMMAND DATA signal, the TRANSPARENT signal line 87 is changed to the L-level state to deactivate the NAND gate 84 for prohibiting the signal transmission from the O/E converter 82 to the E/O converter 83, and said signal is introduced through the signal line 90 to the control circuit for decoding, and the result is transmitted to another station through a line 88.

In case this station transmits signals to another station, the TRANSPARENT signal line 87 is shifted to the L-level state and the signals PRINT START, VSYNC and VIDEO through the signal line 88. In this manner it is rendered possible to prevent repeated transmission of the signals which have circulated the optical fiber loop. The above-described operation mode in which the TRANSPARENT signal line 87 is shifted to the L-level state to prohibit signal transmission from the O/E converter 82 to the E/O converter 83 is called NON-TRANSPARENT mode. The above-mentioned signals COMMAND DATA, PRINT START and VSYNC are identified by discrimination codes in the initial part of said signals, while the VIDEO signals are identified by protocol conducted through the COMMAND DATA signal.

Figure 9B:
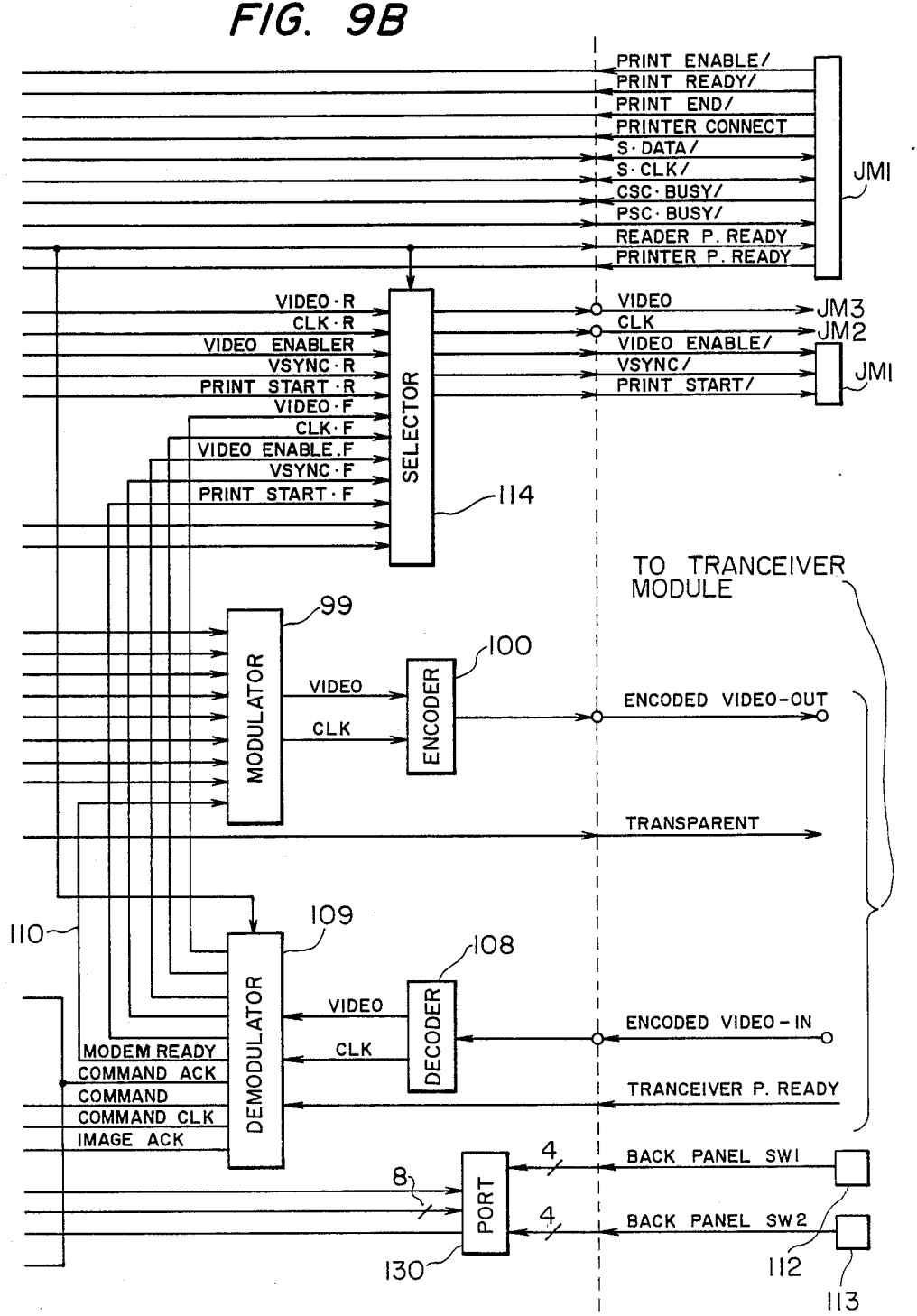
FIG. 9, composed of FIGS. 9A and 9B, is a circuit diagram showing the structure of the communication interface module A.

FIG. 9 shows the structure of the communication interface module A, wherein the signals VIDEO 91, CLK 92, VIDEO ENABLE 93, VSYNC 94 and PRINT START 95 from the connector JR1 of the reader R are supplied to a selector 96 through a connector JN1. If a transmission is instructed by an operation unit provided in the reader R, the CPU 36 (FIG. 5) shift the TRANSPARENT signal line 98 to an Level state prior to the entry of the above-mentioned signals thereby shifting the tranceiver module 70 to the NON-TRANSPARENT mode and terminating the signals from this station. Then a selecting signal SELECT FR 97 for the selector 96 is activated to supply the signals in the lines 91-95 to a modulator 99 thereby generating image signals VIDEO and clock signals CLK, both in serial format. These signals are then supplied to a Manchester encoder 100 for obtaining united signals which are supplied to the line 88 shown in FIG. 8. On the other hand, the COMMAND DATA signal supplied from the CPU 36 of the reader R is sent, through a signal line 115, in parallel manner in a 40-bit shift register 101, wherein said signal consists of command data of 32 bits and an 8-bit command discriminating code at the initial part.

As the data bus line 115 is of an 8-bit structure, the CPU 36 selects signal lines 103, 104, 105 and 106 in succession, at the setting of the 32-bit COMMAND DATA signal, thereby selecting the signal write-in position in the shift register 101 and completing said setting in four steps in response to write-in instruction signals IOWC. After the completion of the fourth setting, the shift register 101 performs shifting operation 40 times to store thus set signals as serial signals 107 into the modulator 99. The encoder 100 encodes said COMMAND DATA signal into a series of signals as explained before and supplies said signals to the E/O converter 83.

The information received through the signal line 90 shown in FIG. 8 is introduced into the Manchester decoder 108 shown in FIG. 9 for separation into the image signals VIDEO and the clock signals CLK, which are then supplied to a demodulator 109 for selectively supplying the signals VIDEO, CLOCK, VIDEO ENABLE, VSYNC, PRINT and START to a selector 114 and regenerating the signals COMMAND DATA and COMMAND CLOCK in a shift register 111. Further generated are a COMMAND ACK signal indicating the duration of 32 bits of the COMMAND DATA signal and an IMAGE ACK signal indicating the duration of continuous output of the VIDEO ENABLE signal, namely the duration of image signals for an entire page.

The transmission of the VIDEO signals from the modulator 99 to the optical fiber F cannot be conducted any time, particularly immediately after the start of power supply, but has to be made, in order to prevent signal collision, only after a confirmation of absence of information in the tranceiver module shown in FIG. 8, namely in the optical fiber F. Consequently the demodulator 109 performs monitoring for this purpose and provides the modulator 99 with a MODEM READY signal 110 after a confirmation, from the READER POWER READY signal and an input signal from the decoder 108, of the presence of power supply in the reader unit R and the absence of information flow in the tranceiver module.

The 32-bit COMMAND DATA signals regenerated in the demodulator 109 are serially supplied to the 32-bit shift register 111. The CPU 36, being shifted to an interruption mode by the COMMAND ACK signal from the demodulator 109, selects the signal lines 103–106 in succession for selecting the signal read-out positions in the shift register 111, thereby reading thus stored signals, 8 bits at a time, in four steps in synchronization with read-out instruction signals IORC and decoding said signals.

Connectors JM1–JM3 (corresponding to the connector 73 shown in FIG. 7) for connecting the present communication interface module with the printer P are respectively connected with the connectors JP1–JP3 In case of a local copying operation with the reader R and the printer P in a station, the selector 114 is changed over by a SELECT PR signal 116, whereby the image signals entered through the lines 91–95 and the connectors JN1–JN3 are transmitted to the printer P through the connector JM1–JM3. Also in case of recording image signals transmitted from another station through the optical fiber F, the selector 114 is controlled by a SELECT PF signal through a line 117, whereby the image signals supplied from the demodulator 109 are transmitted to the printer P through the connectors JM1–JM3.

Also the selector 114 is controlled by the SELECT PR signal supplied through a line 116, whereby the image signals obtained in the reader R are transmitted to the associated printer P, and a selector 96 is controlled by the SELECT FR signal supplied through a line 9 whereby said image signals are also transmitted to the modulator 99. In this manner it is rendered possible to effect local copying of the image signals read in the reader R, by means of the associated printer P, and to simultaneously effect image recording in another distant printer P connected through the optical fiber F.

It is rendered furthermore possible to monitor, without additional monitoring means, the status of the transmitted image signals simultaneously with said transmission.

The communication system of the present embodiment can accomodate up to 10 stations numbered from 0 to 99. The status of 4-bit switches 112, 113 for setting the address for each station is read, through an I/O port 130 and the bus line, by the CPU 36 immediately after the start of power supply.

However plural stations connected in a loop may be powered in a random order, so that information collision may take place on the loop if commands are emitted from plural stations. It is therefore necessary to designate a station for emitting a command after the start of power supply, and such station shall be called a hard master station while other stations shall be called hard slave stations. A hard master designating switch 118 selects only one station as the hard master in the network. The signal from said switch is entered into the CPU, which checks said signal, immediately after the start of power supply, to identify whether the station of said CPU is the hard master station or a hard slave station.

In summary, the signals PRINT START, VIDEO and VSYNC are regenerated, when necessary, in a station which is in the TRANSPARENT mode for transmitting the information from the O/E converter 82 to the E/O converter 83. On the other hand the COMMAND DATA signal is introduced from the O/E converter 82 to the 32-bit shift register 111 in a station in the NON-TRANSPARENT mode without the signal transmission from the O/E converter 82 to the E/O converter 83, and the CPU decodes said signals and supplies the result to the 40-bit shift register 101 for supply to the E/O converter 83.

As explained in the foregoing, the optical fiber loop of the present embodiment can connect 2 to 100 stations, each of which has an address or a discriminating number (00–99) set by the switches 112, 113. In the netwrok, at any time after the start of power supply, there exists only one station having a communicating right, namely a right for transmitting four signals mentioned above. Immediately after the start of power supply said communicating right belongs to a master station selected by the setting switch 115, but said communicating right can be transferred in succession to other slave stations through the exchange of the COMMAND DATA signal. The master and slave stations designated through hardware by the aforementioned switch 118 are respectively called hard master and slave stations, while a station with the communicating right and a station without said right at a certain time after the start of power supply shall be respectively called a soft master station and a soft slave station.

Immediately after the start of power supply, each station performs initializing step. Thus the CPU initializes the RAM and identifies whether it is a hard master station or a hard slave station. As explained in the foregoing, there can exist only one hard master station in the network. After the initialization, the soft master station always transmits the COMMAND DATA signal or the image signal VIDEO within a determined time. A soft slave station performs, in the absence of entry of the data signal from the soft master for a determined period, the initialization of the abovementioned communication line. After the initialization step, the signals COMMAND DATA, VIDEO DATA, PRINT START and VSYNC can only be released from a soft master station which has acquired the communicating right, and soft slave stations only receives or transmits such signals.

The transfer of the communicating right takes place through determined command data to be emitted from the soft master station, and such transfer takes place only when said determined command data are entered simultaneously with a key entry requesting the image transmission at a soft slave station.

The TRANSPARENT mode is assumed only when the electric power supply is interrupted, or when the signals VIDEO DATA, PRINT START and VSYNC are received. Consequently a soft master station is normally in the NON-TRANSPARENT mode. It is assumed in FIG. 7 that the station A is the hard master while the stations B and C are hard slaves. Immediately after the start of power supply, the hard master, which is the station A, transmits determined command signals in order to become the soft master station. In this state the electronic switch 86 (FIG. 8) of the hard master is open, and said switch of a station that has become the soft master station is also open. On the other hand, in a hard slave station, said electronic switch 86 is closed immediately after the start of power supply and is then opened after confirmation that image signals are not received. In this manner the electronic switch 86 of a hard or soft slave station is open in the normal state. Thus, the command signal emitted from the soft master station is received by a hard or soft slave station, decoded therein with addition of data if necessary, and transmitted again to another station. In case the station A is the master, the command signal is transmitted from said station A to the stations B and C in succession and terminated upon returning to the station A.

On the other hand, immediately prior to the transmission of image-related signals PRINT START, VSYNC and VIDEO DATA, the soft master station emits a command signal indicating such transmission, thereby closing the electronic switches 86 in all the soft slave station to form a bypass channel. The electronic switch 86 of the soft slave station returns to the open state by an interruption from the demodulator 109.

Figure 10B:
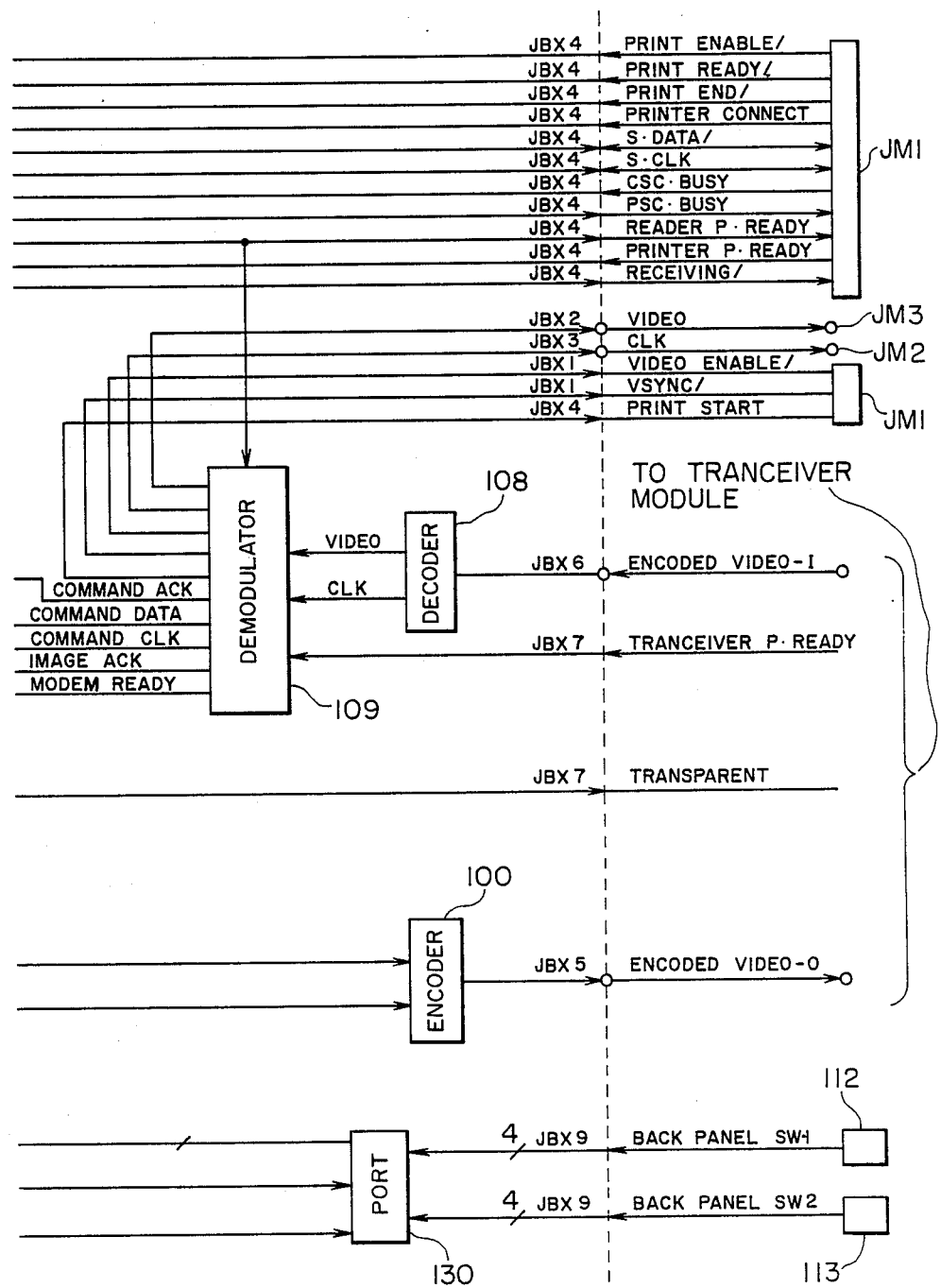
FIG. 10, composed of FIGS. 10A and 10B, is a circuit diagram showing the structure of the communication interface module B.

FIG. 10 shows the structure of the communication interface module B. It is basically same as the communication interface module A shown in FIG. 9, and, as explained before, it is not provided with the connectors for connection with the reader R but with the connectors JM1–JM3 for connection with the printer P. In FIG. 10, components of the same functions as those shown in FIG. 9 are represented by the same numbers.

In the communication module A, the CPU 36 of the reader R performs the communication protocol, circuit control in said module A and protocol between the reader and the printer. The CPU in the DC controller 60 of the printer P is not provided with such functions. Consequently, the communication module B of a station equipped solely with the printer P is provided with a CPU 120 for performing the protocol with the DC controller 60 of the printer P, communication protocol among stations and circuit control in said communication module B. Thus said CPU 120 receives an inquiry from another station, asks the method of processing to the DC controller 60 and transmits the result of said processing according to the command format.

Figure 11:
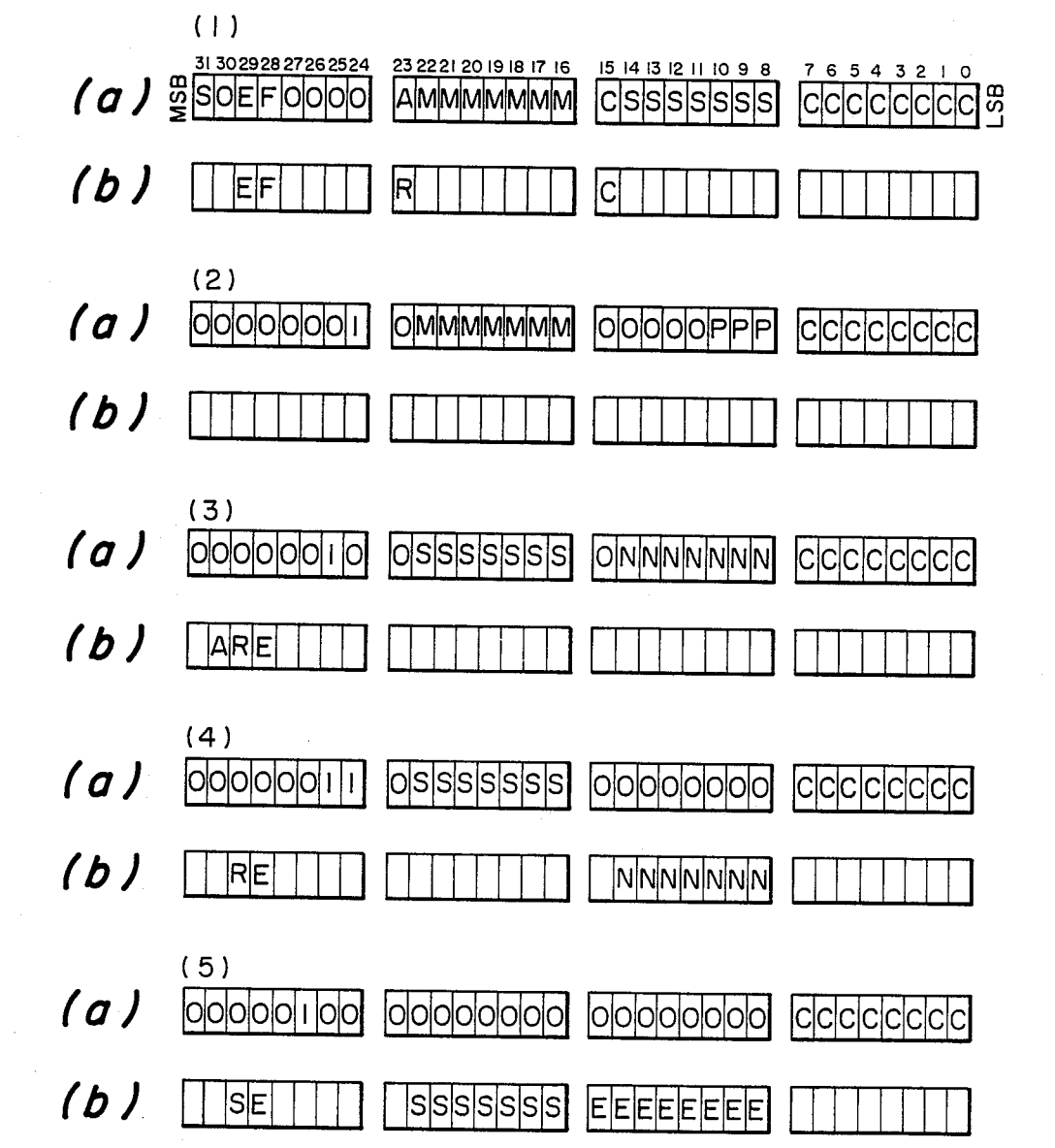

FIG. 11 shows the format of command data signal, and FIGS. 12 to 15 are flow charts showing the programs of information exchange among stations, said programs being stored in the ROM of the communication control unit of each station and executed by the CPU thereof. As explained before, the command data composed of 32 bit signals, are emitted from the soft master station, transmitted through the soft slave stations in the loop with the addition of necessary data and returned to the soft master station.

At the transmission of the command data to the loop channel, the soft master and slave stations maintain the electronic TRANSPARENT switch 86 in the open state. Consequently the command data are read by the CPU of the receiving station and transferred to the next station after certain processing.

In case the power supply is turned off in a station, the transparent switch thereof is closed so that the received command data are transmitted directly to the next station without any processing.

As shown in FIG. 11(1)–(5), there are provided five different command data, in each of which (a) and (b) respectively show the formats in the data transmission and reception. The blank bits in the format (b) are same as those in the format (a). The content of the command data is discriminated by the lower 4 "command number" bits of the upper first byte. Bits "C" in the fourth byte are check sum bits for detecting errors in the data transmission, and are determined by the values in the upper three bytes according to the following equation:

check sum bit (in 4th byte)=0—command bit in 1st byte—command bit in 2nd byte—command bit in 3rd byte.

Figure 12:
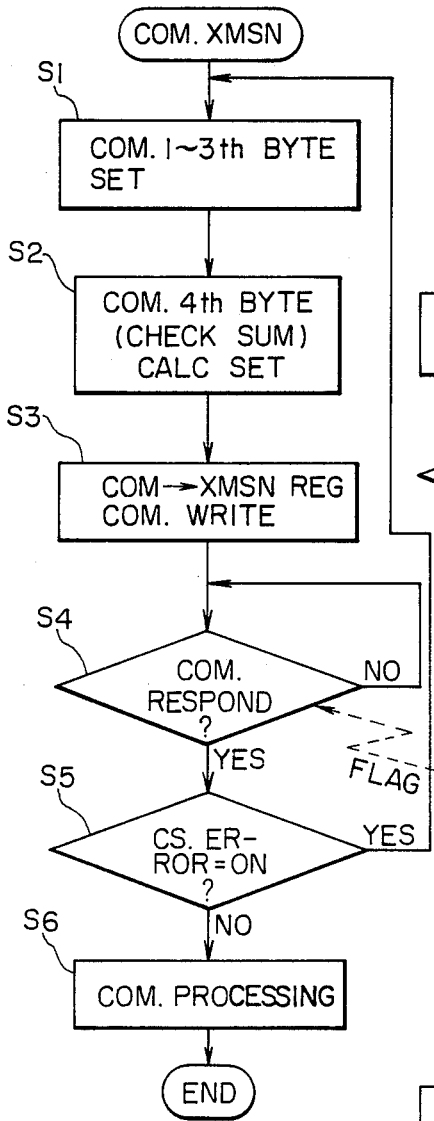
FIG. 12 is a flow chart showing a check sum routine.
Figure 12:
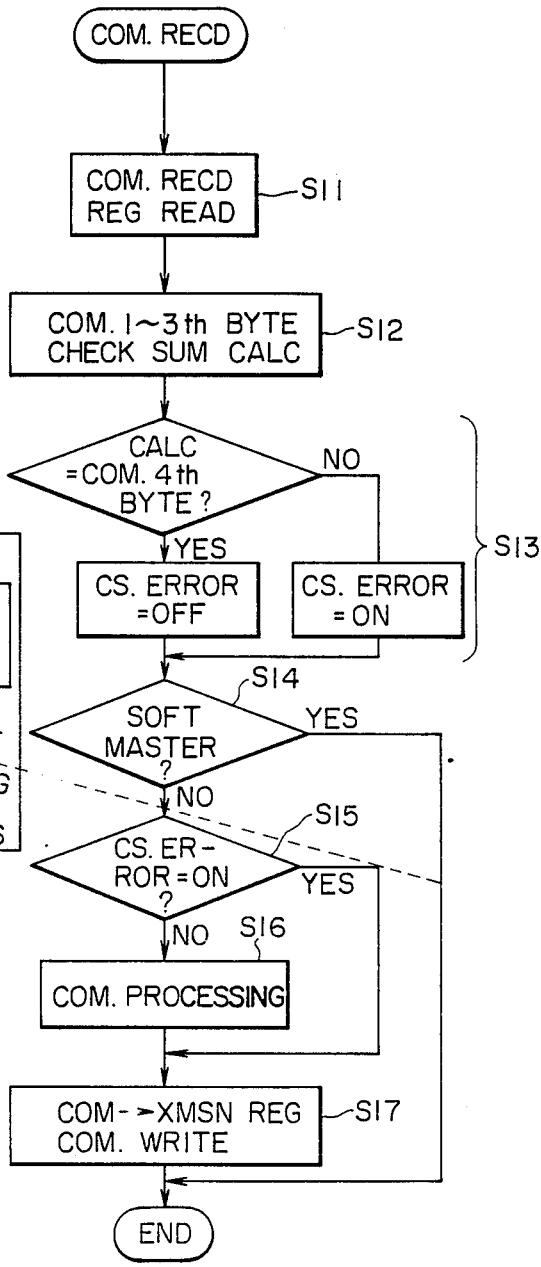

FIG. 12 shows a flow chart for transmission and reception for sum checking, wherein (a) indicates a flow of command data transmission from the soft master station to a next station. At first a step S1 sets the upper 1st to 3rd bytes of the command data. Then a step S2 calculates the check sum bit from the values of the upper 1st to 3rd bits as explained before and sets the obtained value in the 4th byte. A step S3 writes the command data thus set to the 4th byte into the transmission register 101 for transmission to the channel, and a step S4 awaits the response to the thus transmitted command.

Upon entry of a response command, a step S5 identifies if the check sum error bit is on, and, if not, a step S6 executes a process according to the command. On the other hand, if the check sum error bit is on, the command data are again transmitted.

(b) shows a flow of the function of a command-receiving station, which is activated when the demodulator 109 identifies the reception of a command and supplies a COMMAND ACK signal to the CPU.

A step S11 reads the command data set in the 32-bit shift register 111 into the CPU, and a step S12 calculates the check sum bit from the values of the upper first to third bytes. A step S13 then identifies whether the result of calculation obtained in the step S12 is equal to the value of check sum bit in the 4th byte, and turns on or off a check sum flag respectively when the two are different or equal, indicating the presence or absence of an error.

A step S14 identifies whether this station is designated as the soft master station, and, if so, a flag is transferred to the step S4 in the flow (a). If it is not appointed as the soft master station, a step S15 identifies whether the check sum flag is on, and, if so, the program proceeds to a step S17 for transmitting the command with additional data indicating said appointment. On the other hand, if said flag is not set, a step S16 executes a process according to the command, and the program proceeds to the step S17 for transmitting the command to the next station.

Reference is again made to FIG. 11, in which (1) shows a channel check command (CCcom) featured by a command number "0000" and released at a regular interval from the soft master station for checking the channel status, confirmation and notice of stations connected to the channel, transfer and inspection of communicating right and recovery of error in the cannel. In the upper first byte, a bit S is set when connection is made; a bit E indicates an overlapping station address; and a bit F is set when an error in transmission is detected by the check sum bit. Lower 7 bits M in the upper 2nd byte are used for indicating the station address of the soft master station, and a highest bit A in the 2nd byte in the transmission mode is set when the transfer of the communicating right is accepted. A bit R in the reception mode indicates a request for the communicating right from a soft slave station. Lower 7 bits S in the 3rd byte are used for indicating a station address, indicating the presence of a corresponding station in the channel when the highest bit C is set. This command enables over to easily confirm the connection of stations in the network.

(2) shows a slave inhibit command (SIcom) featured by a command number "0001", used for noticing the start of transmission of image signals, inhibited transfer of communicating right, size of transmitted image and designation of address. Bits M in the 2nd byte represent the address of the soft master station emitting the signal as explained before. Lower 3 bits P in the 3rd byte indicate paper size. This command is used solely for notice and does not require particular response.

(3) shows a slave setting command (SScom) featured by a command number "0010", used for confirming the connection of a soft slave station designated as addressee and setting the number of communications. Bits S in the 2nd byte in the transmission mode represent the station number of the soft slave station designated as addressee, and bits N in the 3rd byte indicate the number of communications. In the 1st byte in the reception mode, a bit A indicates a response that the reception is possible; a bit R indicates the reception by a soft slave station designated as the addressee; and a bit E indicates the presence of an overlapping station number. The soft slave station initiates the preliminary operation of the printer in response to this command SS.

(4) shows a slave confirmation command (SCcom) featured by a command number "0011", for confirming the connection of a soft slave station designated as addressee and the number of receptions. In the transmission mode, bits S in the 2nd byte indicate the station address of a soft slave station designated as the addressee. In the 1st byte in the reception mode, a bit R indicates the reception in the soft slave station; and a bit E indicates the presence of an overlapping station number. Bits N in the 3rd byte indicate the number of receptions. A soft slave station which has accepted this command SC is released from the image reception mode, and the local copying mode is enabled.

(5) shows an error check command (ECcom) featured by a command number "0100", for error checking in case of simultaneously designating plural soft slave stations as the addressees and for shifting the TRANSPARENT switch. In the transmission mode this command only has "0", and any soft slave station not involving an error nor designated as the addressee closes the electronic switch 86 in response to this command EC. A soft slave station detecting an error returns this command after setting the station address in the upper 2nd byte and the error status in the 3rd status. The soft master station repeats the emission of this command until an error flag E in the 1st byte becomes zero. Also the local copying mode is enabled in a soft slave station which has set the error status.

The communication protocol is achieved through the exchange of the above-described five command data.

Figure 13:
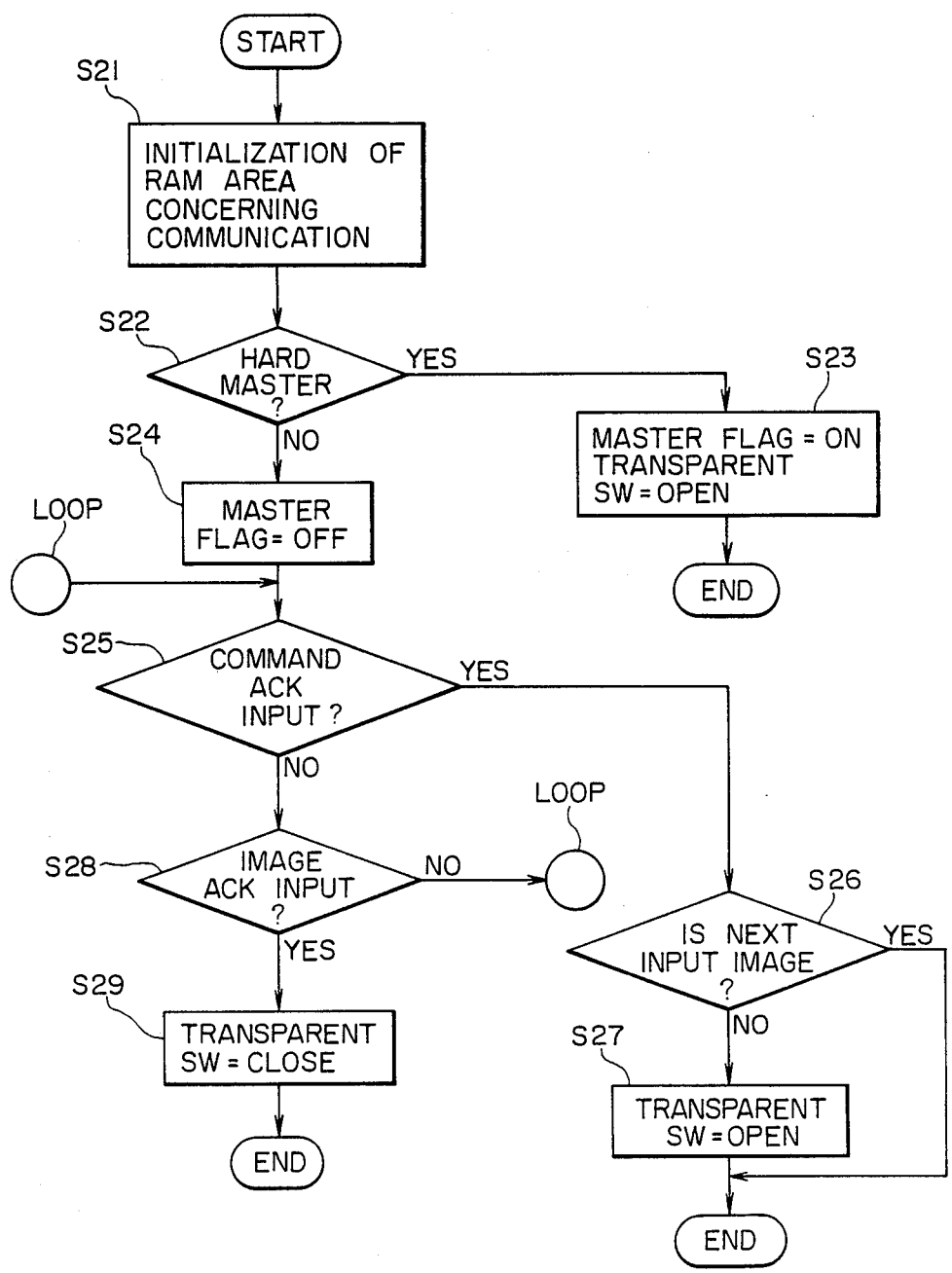
FIG. 13 is a flow chart showing an initializing control.

FIG. 13 shows a flow chart for initialization control of the loop network.

Upon start of power supply to the printers and readers, a step S21 executes initialization, including the RAM area for communication. Then a step S22 identifies, from the state of the aforementioned switch 118 (FIG. 9), whether the station is designated as the hard master station having the first communicating right, and, if so, a step S23 sets a master flag in the RAM and opens the TRANSPARENT switch 86 thereby completing the initialization. On the other hand, if the station is designated as a hard slave, a step S24 clears the master flag, and steps S25, S26 identify the entry of the COMMAND ACK signal indicating the entry of command data or the IMAGE ACK signal indicating the entry of image signals.

In response to the entry of the COMMAND ACK signal, a step S26 identifies whether the received command is the SI command preceding the entry of image signals, and, if so, the initialization step is completed with the TRANSPARENT switch 86 closed in preparation for the entry of said image signals. On the other hand, if the received command is not the SI command, a step S27 terminates the initialization by opening the TRANSPARENT switch 86 in preparation for the entry of the command data.

In response to the entry of the IMAGE ACK signal, the program proceeds to a step S29 for terminating the initialization by closing the TRANSPARENT switch 86. Thus, in case a hard slave station joins a network in which the communication is already going on, the TRANSPARENT switch 86 is controlled according to whether the information, that is already flowing or will be flowing next in the network, is a command or image signals, so that it is rendered possible to avoid undesirable effect, such as interruption of information, at such later joining of a station, by eventual opened state of the switch 86.

Figure 14:
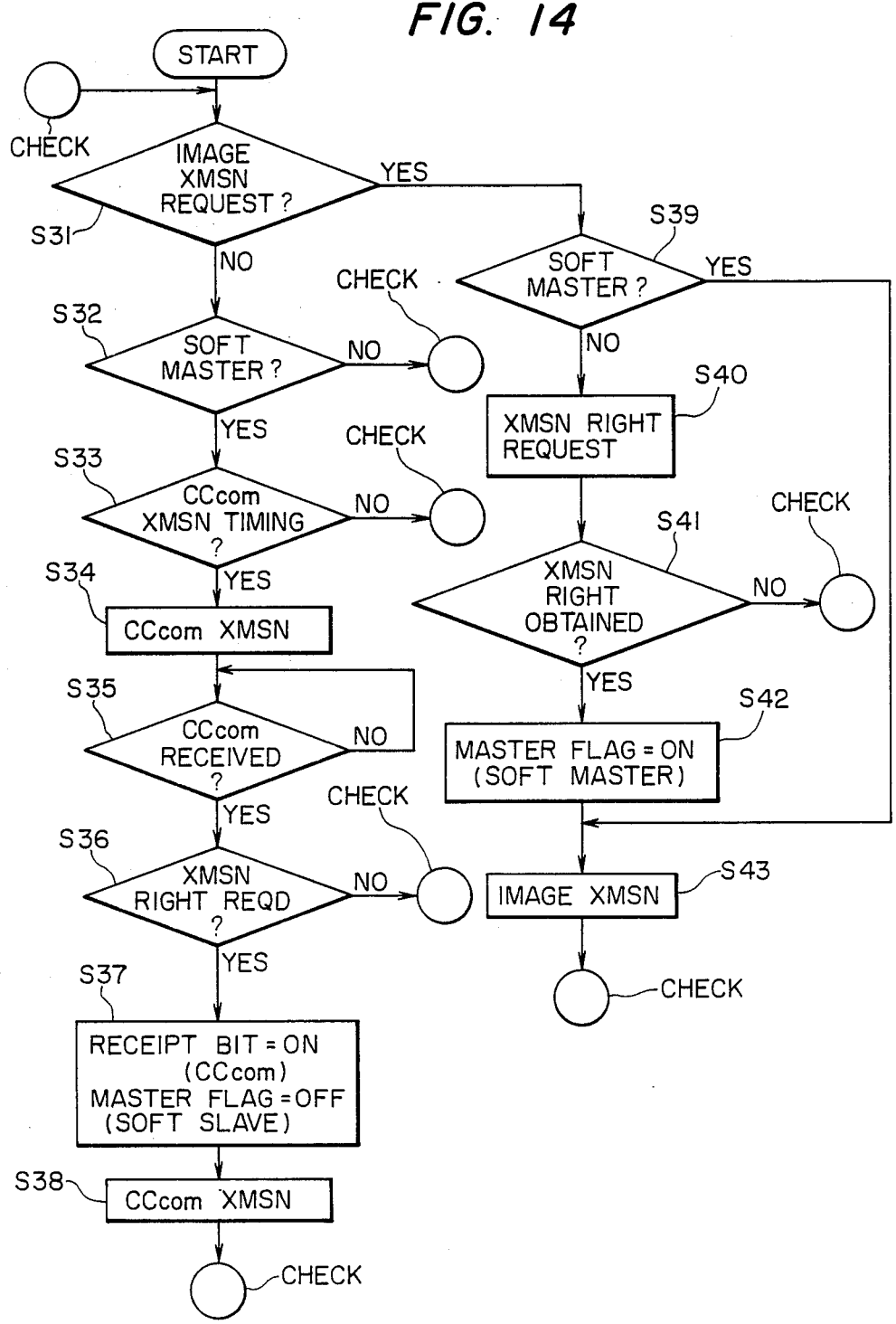
FIG. 14 is a flow chart showing a control for the transfer of communicating right.

FIG. 14 shows a flow chart for transferring the communicating right, or the soft master station, within the network.

At first a step S31 identifies the presence of a request for image transmission by the user, and, if yes, the program proceeds to a step S39 for identifying whether the station is presently designated as the soft master station. In case the station is already designated as the soft master station having the communicating right, the program proceeds to a step S43 for executing the image transmission. On the other hand, if it is not designated as the soft master station, a step S40 transmits, to a station presently designated as the soft master, a request for the communicating right by the aforementioned command CC supplied from said soft master. Upon acquisition of the communicating right in a step S41, a master flag indicating the status of the soft master is set in a step S42, and the image transmission is started in a step S43. If the communicating right cannot be acquired, the program returns to the step S31 and repeats the same procedure.

In the absence of the request for image transmission, the program proceeds to a step S32 to identify whether the station is presently designated as the soft mater, and, if not, the program returns to the step S31.

If the station is designated as the soft master, a step S33 checks the transmission timing of the channel check command CC, and a step S34 transmits said command. Then a step S35 awaits the entry of a response to said command CC, and, if the bit R is set indicating a request for communicating right from another station, the program proceeds from a step S36 to a step S37 for releasing with a set reception bit A and turning off the master flag indicating the status as the soft master station.

The transfer of the communicating right is achieved in this manner through the exchange of the commands CC, so that the network always contains only one soft master station having the communicating right.

Figures 15, 15A:
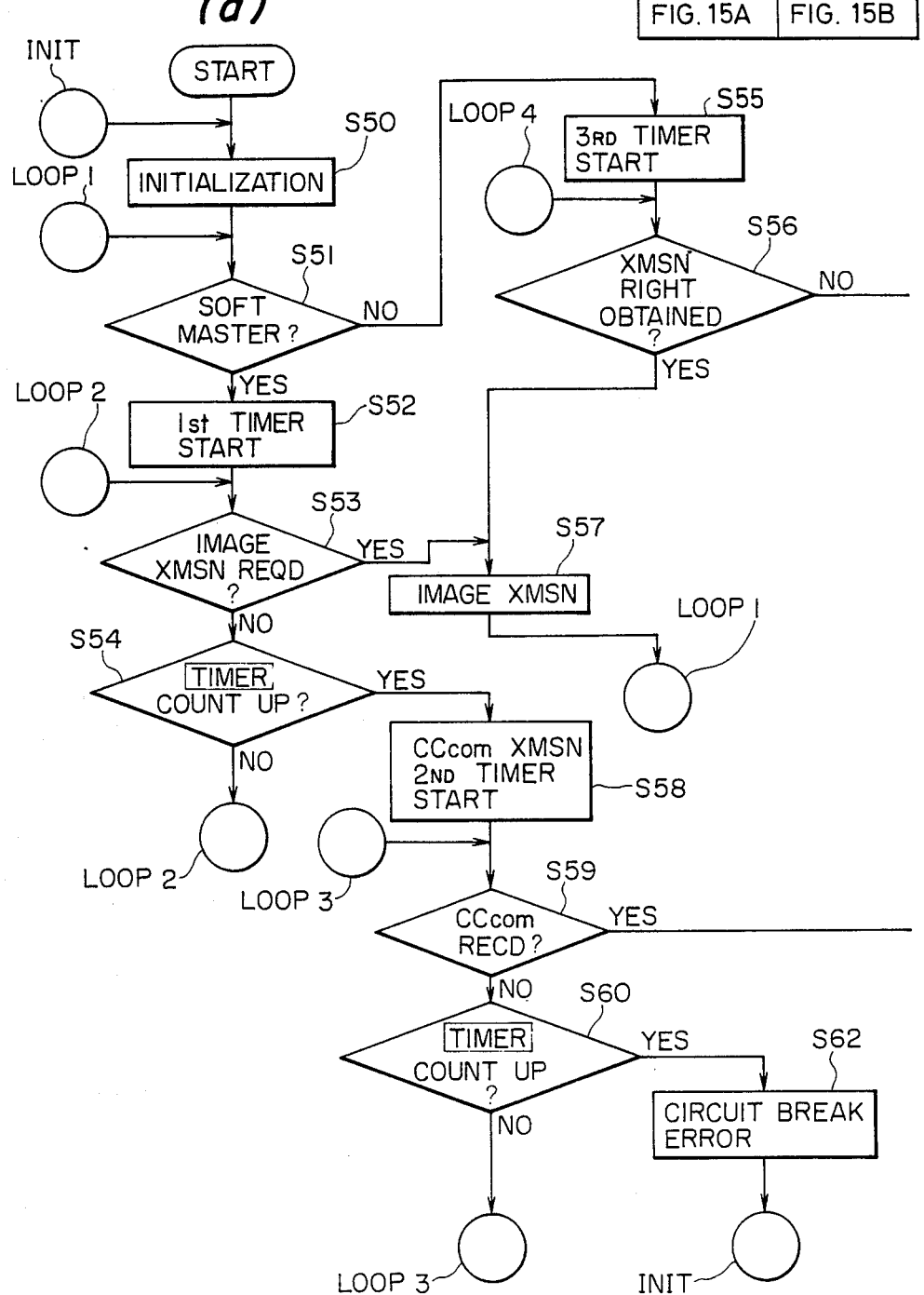
FIG. 15, composed of FIGS. 15A and 15B, is a flow chart showing a control for error detection.

FIG. 15 shows a flow chart for error detection control, in which a flow (a) is used for error detection at the start of function of the system. After the initialization step in a step S50, a step S51 is executed to identify whether the station is designated as the soft master station, and, if so, a step S52 starts a first timer. Then a step S53 identifies the presence of a request for image transmission, and, if present, the image transmission is conducted in a step S57. On the other hand, in the absence of said request, a step S54 awaits the completion of counting operation of said first timer. Upon expiration of the first timer, a step S58 transmits the channel check command CC and starts a second timer. When a step S59 receives the command SS prior to the expiration of the second timer, the program proceeds to a step S61 for identifying the presence of an error flag E in the command CC, and, if absent, the program returns to the step S51. On the other hand, if the error flag E is set in the command CC, indicating the presence of plural stations of a same station address, a step S63 executes the transmission of the command CC again and the program returns to the step S50 for effecting the initialization.

If the command CC is not received prior to the expiration of the second timer, the circuit breakage error is identified in a step S62, and the program proceeds to the step S50 for re-starting the system by initialization.

On the other hand, if the station is identified as a soft slave station after the initialization in the step S50, the program proceeds to a step S55 for starting a third timer.

If the communicating right is acquired prior to the expiration of the third timer, the program proceeds from a step S56 to a step S57 for carrying out the image transmission. However, if the communicating right is not acquired, the program proceeds from a step S64 to a step S66 whereby identified is the absence of the soft master station for some reason, and the program returns to the step S50 for conducting the initialization.

Also the presence of plural masters is identified if the error flag E is set in the entered command CC, and the program returns to the step S50 for conducting the initialization of the system.

Figure 15B:
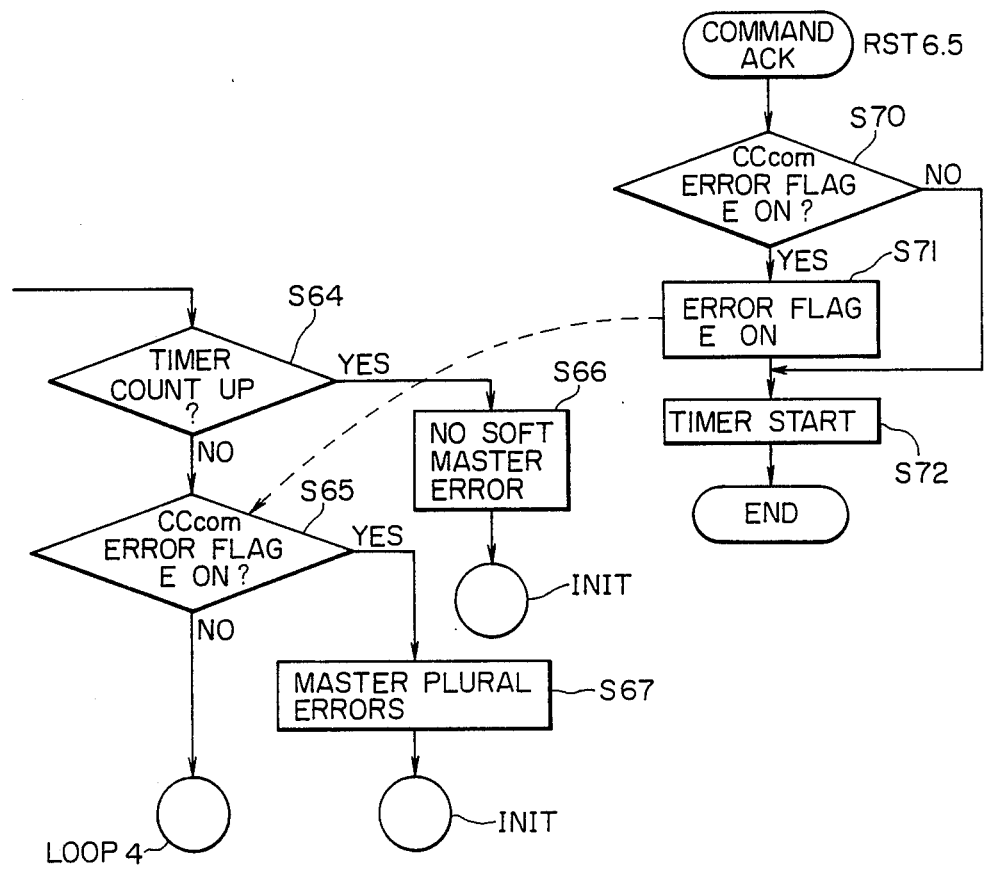
Figure 15B:
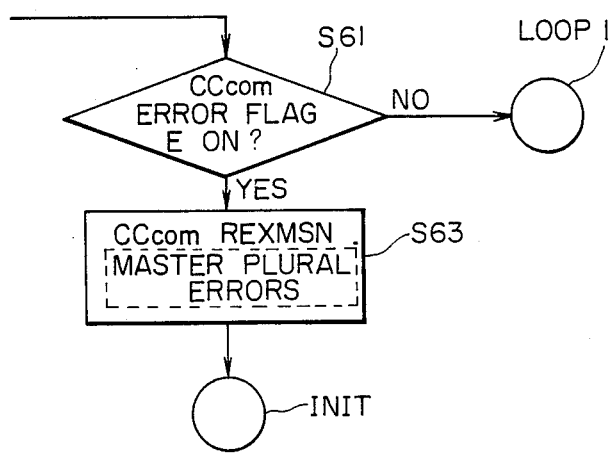

FIG. 15(b) shows a flow chart for error detection in the command exchange procedure. Said flow chart is executed by an interruption procedure of the CPU triggered by the COMMAND ACK signal indicating the entry of command data. At first a step S70 identifies whether an error flag E is set in the entered command CC, and, if present, a step S71 further sets the error flag and releases the command data and a step S72 starts the third timer. On the other hand, if said error flag is not set, the procedure is completed after starting the third timer.

As explained in the foregoing, it is rendered possible to securely check the presence of errors for example in case of absence of a new command within a determined time, absence of transfer of the communicating time of presence of plural stations of a same station address, and such identified error can be eliminated by re-starting the system through repeating the initialization again.

As explained in the foregoing embodiment, each station is provided with the electronic TRANSPARENT switch 86 for by passing the transmitted data. At the initialization step when the power supply is started, a station designated as the hard master station by the setting switch 118 alone can have the initial communicating right, and each station identifies its station number or address from the status of the switch indicating such station number or address. Then the hard master terminates the initialization step by opening the TRANSPARENT switch. Also each hard slave station, not provided with the communicating right, inspects the network, and terminates the initialization step by maintaining the TRANSPARENT switch in the closed state if a command data signal predicts the transmission of image signals, or by opening said switch if such image signal transmission is not conducted. In this manner it is rendered possible to avoid collision, on the network, of command preceding the image signals, to avoid interruption of image signals, and to enable simultaneous transmission of image signals to plural stations.

Also in the present embodiment, there exists only one soft master station capable of transmitting the command data signal and the image signals to the communication channel, and such soft master station is rendered transferable. Also the soft master station notifies, to other stations, whether the transfer of the communicating right is possible or not, and responds to the request for acquiring the communicating right.

Thus the soft master station releases the command at a regular interval, and, each slave station, in response to a request for transmission given by the user, checks the communicating right requesting flag in the entered command, and returns said command after setting said flag if it has not been set. Said soft slave station awaits a response command from the soft master station, and becomes a new soft master station by acquiring the communicating right when the transfer of said right is notified. In this manner no priority is given to any station with respect to the acquisition of the communicating right, and all the stations can evenly become the soft master station.

A station which has acquired the communicating right becomes the soft master station, and supplies the communication channel, at a regular interval, with a command for confirming the connection of the stations constituting the communication system and informing thus confirmed connection status, thereby informing each station constituting the communication system with information on the connection status of the stations. Consequently each station can know the stations connected to the system, without asking to each station.

At the transmission of image signals, a station having acquired the status of the soft master releases a command for identifying whether an addressee printer P is available or not and instructing the start of preliminary operation for image printing if the printer is available. Then the soft master releases a command for asking whether the printer can start the printing operation, and effects the transmission of image signals only after the start of printing operation is confirmed to be possible. The image transmission is achieved in secure and efficient manner as the image signal transmission is conducted after the operation status of the printer is exactly confirmed.

The commands emitted from the soft master station not only realizes the transfer of communicating right and the confirmation of connection status, but also are used for detecting errors in the communicating channel, and, in case of an error, there are conducted initialization of the system and error displays on the stations, thereby achieving rapid recovery from the errors and rapid information on the error.

What we claim is:

1. An information transmission system comprising a plurality of stations, said plurality of stations including at least a first station, which comprises at least a reader, a second station, which comprises at least a printer, and a third station, which comprises both a reader and a printer, all of said plurality of stations being connected to each other through a transmission channel;

wherein image information from each station provided with a reader is transmitted through the transmission channel to a station provided with a printer for image recording;

wherein each station provided with a reader comprises a communication control unit for transmitting image information read in said reader to the transmission channel;

wherein each station provided with both a printer and a reader operates to supply image information through said communication control unit to said printer, said communication control unit comprising selector means for releasing the image information either to said printer or to the transmission channel or to both.

2. An information transmission system according to claim 1, wherein each station comprises at least one of a reader and a printer.

3. An information transmission system according to claim 1, wherein each station provided with a printer performs an image recording operation according to instructions from a communication control unit of a station provided with a reader.

4. An information transmission system according to claim 1, further comprising a transmission channel, said stations being connected to each other through said transmission channel;

wherein image information from a station provided with a reader is transmitted to a station provided with a printer for image recording through said transmission channel;

wherein each station provided with a reader comprises a first interface unit for information delivery between said reader and said transmission channel; and wherein each station provided with only a printer comprises a second interface unit for information delivery between said transmission channel and said printer, said second interface unit being different from said first interface unit.

5. An information transmission system according to claim 4, wherein said first interface unit is for active information transmission and said second interface unit is for passive information transmission.

6. An information transmission system according to claim 1, wherein said plurality of stations are connected to each other through a loop transmission channel.

7. An information transmission system comprising a transmission channel and a plurality of stations, at least one of which comprises at least a reader and at least one of which comprises at least a printer, all of said plurality of stations being connected to each other through said transmission channel;

wherein image information from each station provided with a reader is transmitted to a station provided with a printer for image recording through said transmission channel;

wherein each station provided with a reader for reading an image comprises a communication control unit for transmitting image information from said reader to said transmission channel; and wherein said communication control unit permits transmission of the image information after confirmation of absence of information on said transmission channel.

8. An information transmission system according to claim 7, wherein each station provided with a printer receives the image information through said transmission channel and performs image recording.

9. An information transmission system according to claim 7, wherein said communication control unit operates so as not to transmit the image information if information is present on said transmission channel.

10. An information transmission system for transmitting image information among plural stations through a loop transmission channel, said system comprising a plurality of stations and a loop transmission channel;

wherein each station comprises a switchable path for transmitting the information entered from said transmission channel directly to said transmission channel;

wherein each station, upon reception of image information, forms said path simultaneously with intake of the image information;

wherein each station, upon reception of control information relating to image information, cuts off said path simultaneously with intake of said image information; and wherein each station, when inactive, maintains said path formed.

11. An information transmission system according to claim 10, wherein said path is formed or cut off according to presence or absence of data on said transmission channel.

12. An information transmission system according to claim 10, wherein each station includes means for supplying power for forming said path, when that station is inactive.

13. An information transmission system according to claim 10, wherein each station comprises at least one of a reader for reading an original document to generate image information for recording or for transmission or for both, and a printer for recording an image based on read or intaken image information.

14. An information transmission system for transmitting image information among plural stations through a loop transmission channel, said system comprising a plurality of stations and a loop transmission channel;

wherein each station comprises a switchable path for transmitting the information entered from said transmission channel directly to said transmission channel;

wherein each station, upon reception of image information, forms said path simultaneously with intake of said information;

wherein each station, upon reception of control information relating to image information, cuts off said path simultaneously with intake of said image information; and wherein said path is formed or cut off according to presence or absence of data on said transmission channel.

15. An information transmission system according to claim 14, wherein said path is formed when a corresponding station is inactive.

16. An information transmission system according to claim 14, wherein said path is formed when data on said transmission channel is image information.

17. An information transmission system according to claim 14, wherein each station comprises at least one of a reader for reading an original document to generate image information for recording or for transmission or for both, and a printer for recording an image based on read or intaken image information.

18. An information transmission system according to claim 1, wherein command information relating to an operation of image information transmission is exchanged among said communication control units prior to transmission of image information.

19. An information transmission system comprising a station, which comprises a reader and a printer, connected to a transmission channel;
wherein image information from said reader is transmitted to another station through the transmission channel;
wherein said station comprises a communication control unit for transmitting image information from said reader to the transmission channel;
wherein said station operates to supply the image information through said communication control unit to said printer; and
wherein said communication control unit comprises selector means for selectively releasing the image information either to said printer or to said transmission channel or to both.

20. An information transmission system according to claim 19, wherein said reader operates to form the image information using a first reference signal in a case in which the image information is transmitted to the transmission channel and a second reference signal, different from the first reference signal, in a case in which the image information is supplied to said printer.

21. An information transmission system according to claim 19, wherein command information relating to an operation of image information transmission is transmitted to the transmission channel by said communication control unit prior to the transmission of image information.

22. An information transmission system comprising a plurality of stations, said plurality of stations including at least a first station, which comprises at least means for generating image information, a second station, which comprises at least means for forming an image, and a third station, which comprises both a generating means and a forming means, all of said plurality of stations being connected to each other through a transmission channel;
wherein image information from each station provided with a generating means is transmitted through the transmission channel to a station provided with a forming means;
wherein each station provided with a generating means comprises a communication control unit for transmitting image information generated by said generating means to the transmission channel;
wherein each station provided with both a forming means and a generating means operates to supply image information through said communication control unit to said forming means; and
wherein said communication control unit comprises selector means for releasing the image information either to said forming means or to the transmission channel or to both.

23. A information transmission system according to claim 22, wherein said generating means comprises a reader for reading an original document to generate image information.

24. An information transmission system according to claim 22, wherein said forming means comprises a printer for recording an image on a recording medium on the basis of image information.

25. An information transmission system according to claim 22, wherein command information relating to an operation of image information transmission is exchanged among said communication control units prior to transmission of image information.

26. An information transmission system according to claim 22, wherein each station provided with a forming means performs an image forming operation according to instructions from a communication control unit of a station provided with a generating means.

27. An information transmission system comprising a transmission channel and a plurality of stations, at least one of which comprises at least means for generating image information and at least one of which comprises at least means for forming an image, all of said plurality of stations being connected to each other through said transmission channel;
wherein image information from each station provided with a generating means is transmitted to a station provided with a forming means through said transmission channel;
wherein each station provided with a generating means comprises a communication control unit for transmitting image information generated by said generating means to said transmission channel; and
wherein said communication control unit permits transmission of the image information after confirmation of absence of information on said transmission channel.

28. An information transmission system according to claim 27, wherein each station provided with a forming means receives the image information through said transmission channel and performs image formation.

29. An information transmission system according to claim 27, wherein said communication control unit operates so as not to transmit the image information if information is present on said transmission channel.

30. An information transmission system according to claim 27, wherein said generating means comprises a reader for reading an original document to generate image information.

31. An information transmission system according to claim 27, wherein said forming means comprises a printer for recording an image on a recording medium on the basis of image information.

32. An information transmission system comprising a station, which comprises means for generating image information and means for forming an image, both connected to a transmission channel;
wherein said station comprises a communication control unit for transmitting image information generated by said generating means to the transmission channel;
wherein said station operates to supply the image information through said communication control unit to said forming means;
wherein image information generated by said generating means is transmitted to another station through the transmission channel; and
wherein said communication control unit comprises selector means for selectively releasing the image information either to said forming means or to said transmission channel or to both.

33. An information transmission system according to claim 32, wherein said generating means operates to form the image information using a first reference signal in a case in which the image information is transmitted to the transmission channel and a second reference signal, different from the first reference signal, in a case in which the image information is supplied to said forming means.

34. An information transmission system according to claim 32, wherein command information relating to an operation of image information transmission is transmitted to the transmission channel by said communication control unit prior to the transmission of image information.

35. An information transmission system according to claim 32, wherein said generating means comprises a reader for reading an original document to generate image information.

36. An information transmission system according to claim 32, wherein said forming means comprises a printer for recording an image on a recording medium on the basis of image information.

* * * * *